(12) United States Patent
Brown et al.

(10) Patent No.: US 6,256,511 B1
(45) Date of Patent: Jul. 3, 2001

(54) DUAL-MODE RADIO ARCHITECTURE

(75) Inventors: David Alan Brown; Fraser Murray Edwards, both of Bishop's Stortford (GB); John Jackson Nisbet, Nepean (CA); Christian Ansorge, Ulm (DE)

(73) Assignee: Nortel Network Limited, Montreal (CA)

( * ) Notice: Subject to any disclaimer, the term of this patent is extended or adjusted under 35 U.S.C. 154(b) by 0 days.

(21) Appl. No.: 09/117,906
(22) PCT Filed: Feb. 14, 1997
(86) PCT No.: PCT/GB97/00422
§ 371 Date: Apr. 22, 1999
§ 102(e) Date: Apr. 22, 1999
(87) PCT Pub. No.: WO97/30523
PCT Pub. Date: Aug. 21, 1997

(30) Foreign Application Priority Data

Feb. 16, 1996 (GB) .................................................. 9603316

(51) Int. Cl.[7] .............................. H04B 1/38; H04B 1/40; H04B 1/26
(52) U.S. Cl. ........................... 455/552; 455/84; 455/314; 455/553
(58) Field of Search .................................... 455/553, 552, 455/76, 118, 313, 314, 315, 84

(56) References Cited

U.S. PATENT DOCUMENTS

| | | | |
|---|---|---|---|
| 4,955,083 | * | 9/1990 | Phillips et al. ........................ 455/47 |
| 5,228,074 | * | 7/1993 | Mizikovsky ........................ 455/553 |
| 5,392,460 | * | 2/1995 | Mattila et al. ........................ 455/76 |
| 5,396,653 | * | 3/1995 | Kivari et al. ........................ 455/88 |
| 5,404,579 | * | 4/1995 | Obayashi et al. ........................ 455/74 |
| 5,406,615 | | 4/1995 | Miller, II et al. ........................ 379/59 |
| 5,423,076 | * | 6/1995 | Westergren et al. ........................ 455/86 |
| 5,428,664 | | 6/1995 | Kobayashi ........................ 379/58 |
| 5,471,652 | * | 11/1995 | Hulkko ........................ 455/76 |
| 5,519,887 | * | 5/1996 | Lieu ........................ 455/266 |
| 5,535,432 | * | 7/1996 | Dent ........................ 455/77 |
| 5,550,895 | * | 8/1996 | Burson et al. ........................ 455/552 |
| 5,564,076 | * | 10/1996 | Auvray ........................ 455/76 |
| 5,640,686 | * | 6/1997 | Norimatsu ........................ 455/74 |

FOREIGN PATENT DOCUMENTS

| | | | |
|---|---|---|---|
| 0541305A1 | 5/1993 | (EP) | ............. H03D/7/16 |
| 0581573A1 | 2/1994 | (EP) | ............. H04B/1/40 |
| 0595781A2 | 5/1994 | (EP) | ............. H04B/1/40 |
| 0656735 | * 11/1994 | (EP) | ............. H04Q/7/32 |
| 0678974A2 | 10/1995 | (EP) | ............. H03D/7/16 |
| 0823790 | * 2/1998 | (EP) | ............. H04B/1/40 |
| WO 92/02991 | 2/1992 | (WO) | ............. H04B/1/40 |

\* cited by examiner

*Primary Examiner*—Vivian Chang
*Assistant Examiner*—Charles N. Appiah
(74) *Attorney, Agent, or Firm*—Lee, Mann, Smith, McWilliams, Sweeney & Ohlson

(57) ABSTRACT

This invention relates to a radio transceiver operable in multiple modes. The transceiver is operable, in one embodiment, to communicate with digital and analogue modulation format cellular radio systems. The handset utilizes a novel frequency plan and architecture to enable a minimum level of complexity for dual-moe operation. The frequency plan preferably uses two local oscillators 1LO, 2LO to general all the required frequencies for both the digital and analogue modulation format transceivers, derived from a single reference crystal oscillator. A radio architecture is used to enable switchable dual-mode operation with maximum commonality of functional blocks to facilitate silicon integration.

11 Claims, 13 Drawing Sheets

Fig. 3  PCS1900 - AMPS Radio Frequency Plan

Fig. 9  DCS1800 – DECT

DCS 1800 – GSM

Fig. 11  DCS1800-GSM Radio

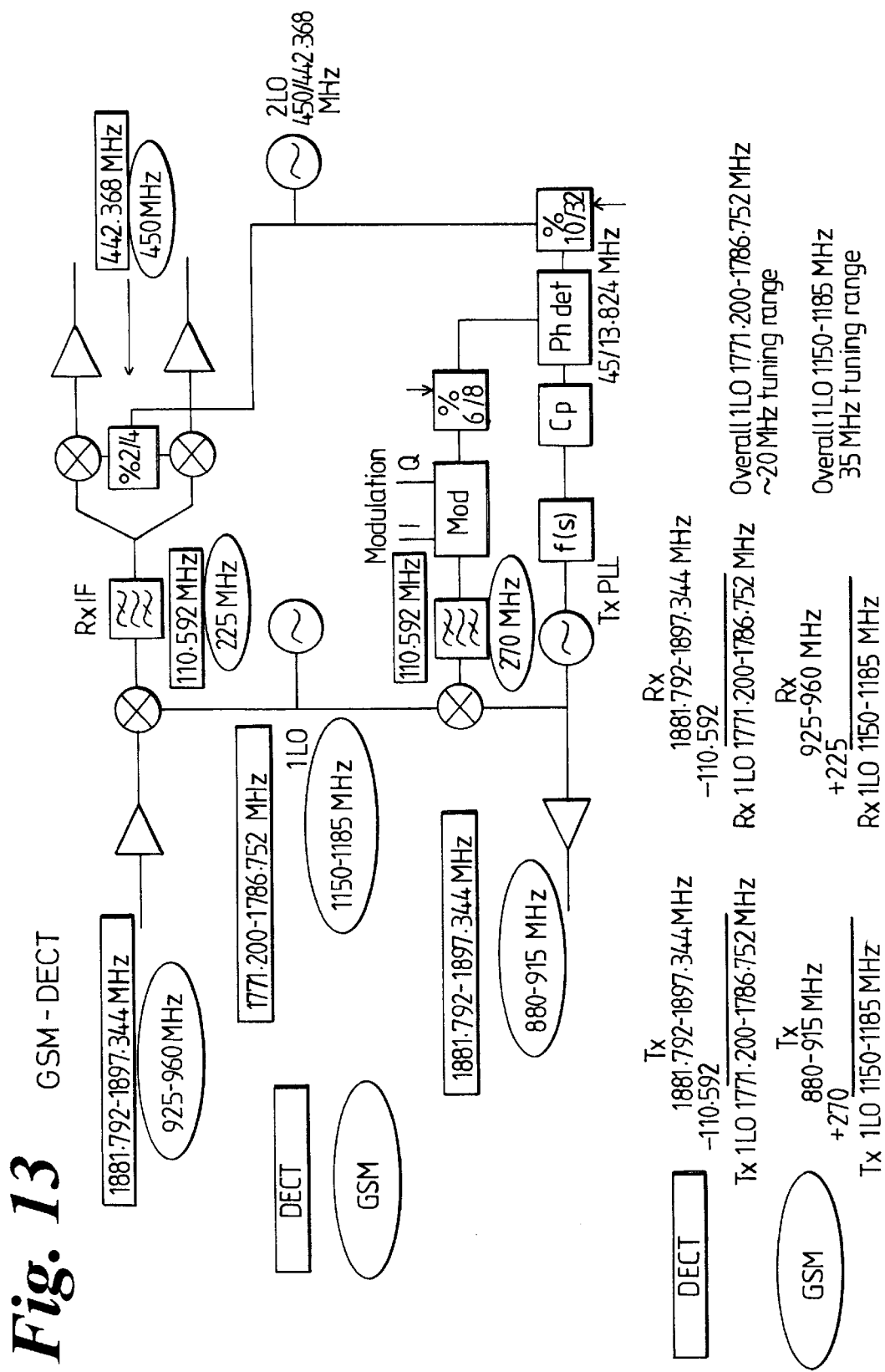
Fig. 13 GSM - DECT

DUAL-MODE RADIO ARCHITECTURE

FIELD OF INVENTION

The present invention relates to a dual mode radio architecture and, in particular, relates to the same for use in a mobile radio handset.

BACKGROUND ART

Personal communication networks are being deployed extensively worldwide using mobile radio systems. Early cellular networks, still in operation, use analogue modulation formats for the radio air interface protocol. These analogue networks exhibit the problem of call saturation in high usage areas. The North American AMPS system is typical of such an analogue system.

To overcome this problem higher capacity air interface protocols using digital modulation format networks have been introduced, oftentimes operating in tandem with analogue networks, providing cellular radio coverage that by both systems. Examples of digital moblie phone networks currently in operation are the PCS1900, DCS1800 and GSM systems, which are national and supra-national standardised radio air interface protocols (AIPs).

Nevertheless, these networks exhibit the problem of not having global operation. To overcome this problem, additional global radio air interface protocols using digital modulation format networks via satellite have been introduced, such as the digital ODYSSEY system. Furthermore, short range cordless networks, such as the digital CT2 version of the US unlicensed UPCS band, or DECT are becoming increasingly employed.

In a large country such as the United States or Canada the early standardised analogue network known as AMPS has reached a fairly universal coverage of the populated North American continent. The newer digital networks tend to be deployed in areas of high usage. A result of this is that there are areas of digital network coverage overlaying a universal analogue network coverage. Additionally different air interface protocol standards of digital networks have been deployed regionally, since different telecommunications operators have developed their own protocols or have developed such protocols in line with national and sometimes international standards authorities, for example, the GSM protocol.

Whilst it is reasonable to suppose that handsets operable for different radio communications protocols are similar from the users point of view, it is not possible, in particular, to use a digital mobile radio for use in an analogue cellular region and vice versa. This stems from the fact that whilst both types of handsets possess antennas, radio front end transmitter, receiver and baseband circuits, they operate on different air interface protocols with different radio carrier frequencies, duplex timing and modulation formats, which are incompatible.

Therefore it can be seen that each individual personal communications system user will need a dual network service for complete coverage. Consequently the user requires a handset that will not only function throughout the coverage area of the specific subscribed-to digital network, but also have a switched alternative mode to operate on the universal analogue network.

There is a likely deployment scenario where the mobile terminal user wishes to access the two communication operating systems. Therefore there is a need for a dual-mode PCS1900/AMPS, PCS/UDCS, PCS/ODYSSEY, DCS1800/GSM, GSM/DECT, DCS1800/DECT, JDC/Handyphone and JDC/ODYSSEY handsets, to name but a few.

The problem of implementing a dual mode handset has been considered to be surmountable by two different approaches: The first solution uses two separate radio transceivers piggybacked and combined at the antenna and at the man-machine interface (keyboard and audio); The second solution uses two separate radio sections piggybacked and combined at the digital signal processing part of the radio transceiver. These two approaches have problems in that they are complicated and unwieldy, and it is clear that a dual-mode radio architecture with an increased functional commonality of circuits would be the most cost effective solution.

OBJECT OF THE INVENTION

The present invention seeks to provide a dual mode radio architecture.

STATEMENT OF INVENTION

In accordance with one aspect of the present invention, there is provided a radio front end transceiver operable to receive and transmit radio signals in different frequency bands and modulation formats, the transceiver comprising; receive and transmit paths for each modulation format, wherein common receive and transmit intermediate frequency circuitry is employed and the local oscillator requirements for the intermediate frequency to baseband conversion are derived from a single frequency synthesiser.

Preferably, the first local oscillator requirements for the intermediate frequency to radio frequency conversion are derived from a single frequency synthesiser.

Preferably, a single first local oscillator is used and the required dual mode operation is achieved by using a dual band voltage controlled oscillator and a programmable synthesiser. The first local oscillator can employ overlap tuning in order to constrain the voltage controlled oscillator tuning range appropriate for the dual band.

The transceiver can comprise a single second local oscillator, wherein the required dual mode operation is achieved by integer division of the second local oscillator to derive the required local oscillator input signals. Two first local oscillators can be used and the required dual mode operation can be achieved by operating each of the required RF front-ends from a specific first local oscillator.

The higher frequency radio system local oscillator bands can be arranged to overlap, by switching intermediate frequencies, whereby the tuning range is constrained to avoid retuning between transmit and receive.

Preferably the transceiver is provided with a means to determine the operational mode. Alternatively, switch means may be provided to effect a change in operational mode.

In accordance with another aspect of the present invention, there is provided a radio transceiver comprising a combination of functional block circuits and frequency plan,
  wherein, in a first circuit, disparate radio air interface signals are downconverted, with a first local oscillator, and filtered with switched separate intermediate frequency filters, amplified and converted using a second local oscillator, to in-phase and quadrature baseband signals, in a common sub-system of functional blocks,
  wherein, in a second circuit, disparate baseband modulation format in-phase and quadrature signals are upconverted to their respective disparate radio air interface signals in a common subsystem of functional blocks configured as a phase lock loop upconverting modulator, which uses a common first local oscillator to the receive circuit and a reference derived from the prime second local oscillator, wherein, the frequency synthesis is arranged so that only two phase locked voltage controlled oscillators are required, with the two receive second local oscillator frequencies integer relationship derived from the prime second local oscillator, itself phase locked to the frequency reference, and the first local oscillator frequencies all derived from the same frequency reference, with the higher frequency radio system local oscillator bands arranged to exactly overlap, by switching intermediate frequencies, so as to constrain the tuning range to avoid retuning between transmit and receive.

The present invention also provides a handset incorporating a dual band transceiver.

In accordance with another aspect of the invention, there is provided a method of operating a radio front end transceiver operable to receive and transmit radio signals in different frequency bands and modulation formats, wherein for each modulation format the same receive and transmit intermediate frequency circuitry is employed and the local oscillator requirements for the intermediate frequency to baseband conversion are derived from a single frequency synthesiser.

In accordance with another aspect of the invention, there is provided a method of operating a radio front end transceiver operable to receive and transmit radio signals in different frequency bands and modulation formats, wherein for each modulation format the same receive and transmit circuitry is employed and the local oscillator requirements for the radio frequency to intermediate frequency and intermediate frequency to baseband conversions are derived from a single frequency synthesiser.

In accordance with a still further aspect of the invention, there is provided a method of operating a mobile radio handset operable to receive and transmit radio signals in different frequency bands and modulation formats, wherein for each modulation format the same receive and transmit intermediate frequency circuitry is employed and the local oscillator requirements for the intermediate frequency to baseband conversion are derived from a single frequency synthesiser.

In accordance with a yet further aspect of the invention, there is provided a method of operating a mobile radio handset operable to receive and transmit radio signals in different frequency bands and modulation formats, wherein for each modulation format the same receive and transmit circuitry is employed and the local oscillator requirements for the radio frequency to intermediate frequency and intermediate frequency to baseband conversions are derived from a single frequency synthesiser.

BRIEF DESCRIPTION OF DRAWINGS

In order that a greater understanding of the invention be attained, embodiments of the invention will now be described with reference to the accompanying drawings, wherein:

FIG. 13 is a frequency plan of a GSM-DECT dual mode radio front end.

DETAILED DESCRIPTION

Figure 1:
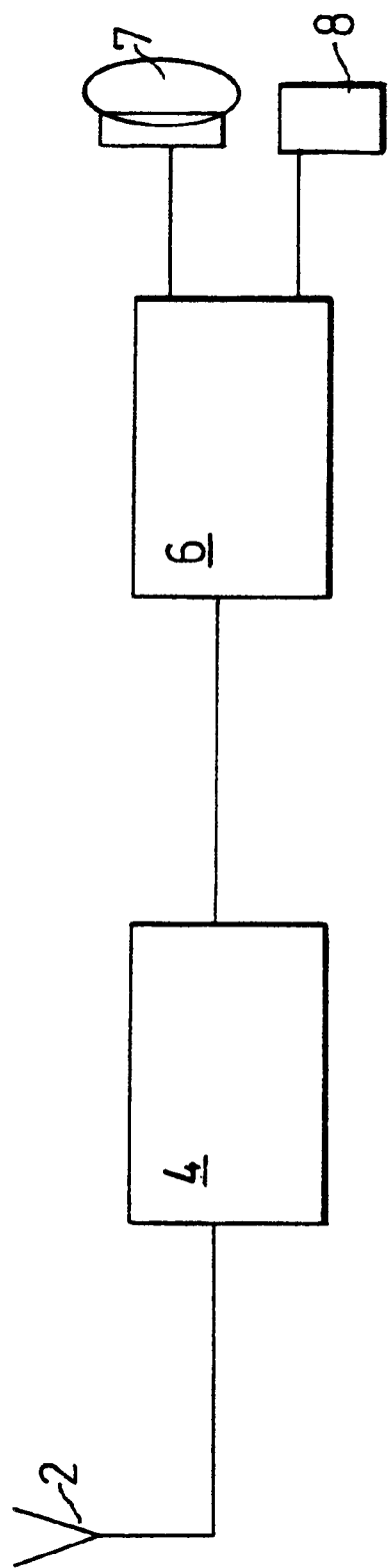
FIG. 1 depicts a typical handset outline schematic.

FIG. 1 shows an outline block diagram of a typical cellular radio handset. Radio frequency signals are received and transmitted by the antenna 2 which is connected to a radio front end 4. In the radio front end transmit and receive signals are converted between radio frequency and base band, whereby digital signal processing means 6 encode the transmit and decode the receive signals and from these can determine the audio signals which are communicated to and from the handset user by loudspeaker 7 and microphone 8. The front end will typically contain transmit and receive paths which are mixed to an intermediate frequency with a local oscillator. These intermediate frequency signals will be further processed and mixed so that the input and output signals to and from the front end are at baseband and suitable for digital to analogue or analogue to digital conversion, as appropriate, prior to digital signal processing.

Figure 2:
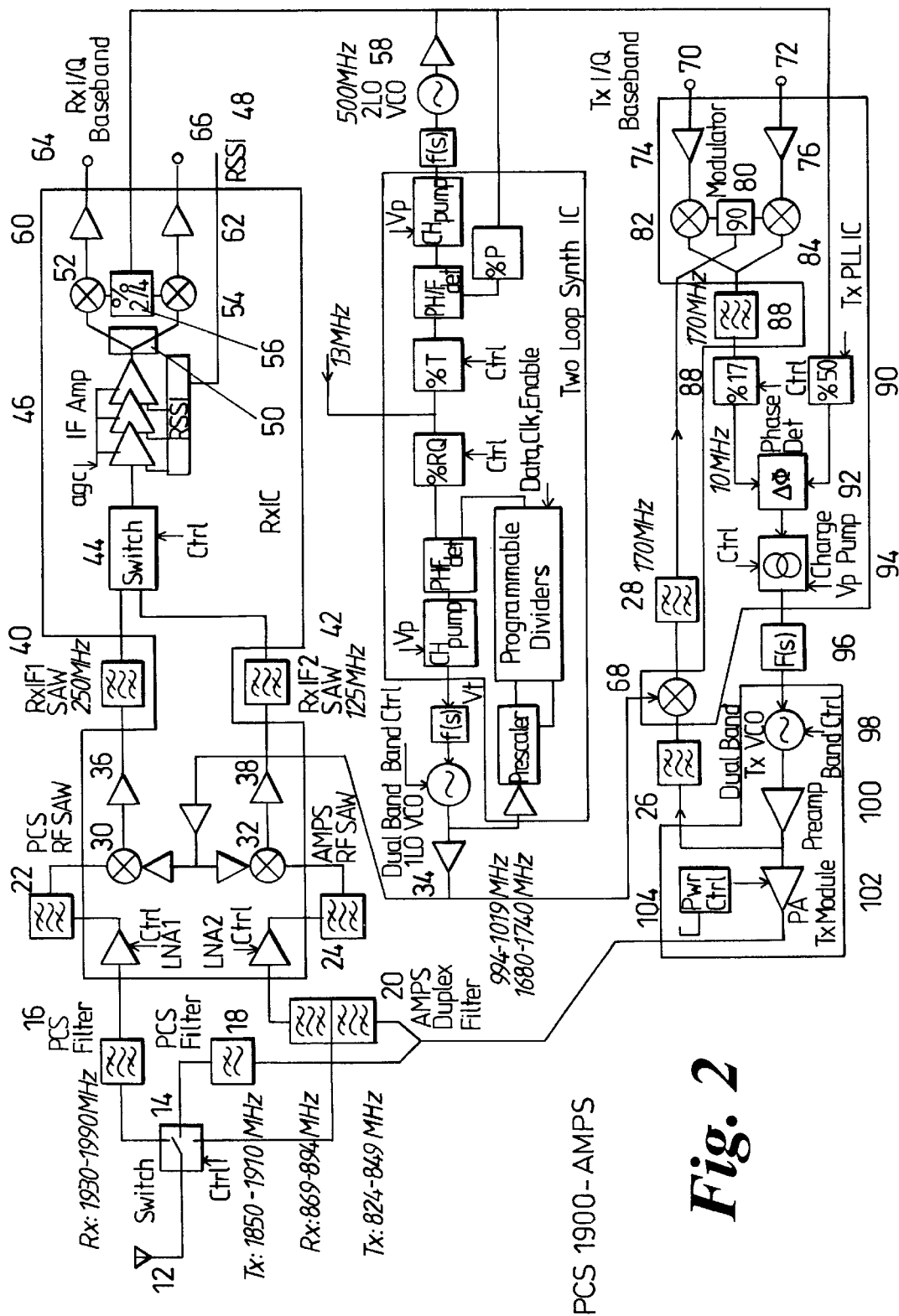
FIG. 2 is a detailed implementation of a PCS1900-AMPS dual mode radio front end.

Referring now to FIG. 2, there is shown one embodiment of the present invention, comprising a dual mode radio front end for the reception of both digital PCS1900 signals and analogue AMPS signals. PCS1900 operates in the frequency band 1930 to 1990 MHz on the receive downlink to the handset and in the 1850 to 1910 MHz band on the transmit uplink from the handset. AMPS operates in the frequency band 869 to 894 MHz on the receive link from the basestation to the handset and in the 824 to 849 MHz band on the transmit link from the handset to the basestation.

The PCS1900 handset operates either in a transmit mode or in a receive mode: AMPS can operate in both modes simultaneously. For this reason the switch 14 from the antenna 12 has three positions. Band pass filter 16 and lowpass filter 18 are provided on the input and output lines for the PCS1900 signals whilst a single duplex filter 20 is employed for the input and output lines of the AMPS signals. Low noise amplifiers LNA1 and LNA2 are provided on the input for PCS1900 and AMPS modes. Power amplification is provided by a dual band PA.

For PCS1900 and AMPS separate band filters 22 and 24 are provided from the outputs of the LNAs to the inputs to the mixers 30 and 32. Similarly separate IF channel filters are provided 40 and 42. Preferably these filters are radio frequency surface acoustic wave SAW devices. These SAW devices can be fabricated on quartz, as is known. The advantages provided are such that the separate receive bands can be converted down to an IF and separate channel selection performed, so that over each RF band a large number of channels can be determined.

Turning now to the receive path for the digital PCS1900 signals, when the switch 14 directs incoming digital PCS1900 signals to the PCS1900 receive path, the signals from the band select filter 22 are passed to a mixer 30 which mixes the received signal with a signal from a synthesised local oscillator 34 to produce an intermediate frequency (IF) signal at 250 MHz which is subsequently amplified by further amplifying means 36. The PCS1900 signals are then filtered by the 250 MHz IF channel filter, and the filtered IF signal is then passed through a second switching circuit 44 which operates simultaneously with the first switch 14 by a mode control means (not shown). The mode control means identifies whether the signals are PCS1900 or AMPS modulation and determines in which mode the transceiver is operating.

The receive signal output from switch 44 is fed to an IF amplifier with automatic gain control and a receive signal strength indicator (RSSI) 48. After amplification, the signal path is routed through splitter 50 and the signals are output to a mixer pair 52 and 54, and after mixing with a quadrature 250 MHz signal derived through switchable division in 56 from a synthesised 500 MHz second local oscillator (2LO), in-phase and quadrature baseband signals are amplified by amplifiers 60 and 62, to provide output signals at 64 and 66 to be fed to the analogue to digital converters and digital signal processing means (not shown).

If an analogue AMPS radio signal were present at the antenna and a decision made to receive that signal, the switch 14 would feed the signal from the antenna 12 through duplex filter 20, amplifier LNA2, filter 24 to mixer 32. At mixer 32 the radio frequency signal is downconverted, using a synthesised local oscillator to a further intermediate frequency (IF) of 125 MHz which is different from that of the digital PCS1900 case. This IF signal is subsequently amplified by amplifying means 38 before channel selection by the 125 MHz filter means 42. The 125 MHz IF signal is then passed through the switching circuit 44. As in the case with the digital PCS1900 signal, the analogue AMPS IF signal is output through the common IF amplifier, which, after amplification and mixing with a quadrature 125 MHz local oscillator signal derived through switchable divider 56 from the second local oscillator (2LO), in-phase and quadrature baseband signals are provided at 64 and 66 to be fed to the analogue to digital converters and digital signal processing means (not shown).

The custom receive IC uses separate PCS1900 and AMPS LNA/down converters with external SAW image filters. Separate SAW intermediate frequency filters at 250 MHz and 125 MHz are used for PCS1900 and AMPS. For both systems the IF filtering is arranged to be for a single channel.

For transmit, the PCS1900 and AMPS baseband signals are raised to a common 170 MHz intermediate frequency (IF) within a phase lock loop (PLL) which effectively converts the 170 MHz IF to any selected channel in either the PCS1900 or AMPS RF bands. The baseband signals, derived from digital signal processing and digital to analogue converters (not shown), are input at ports 70 and 72, and are amplified by amplifiers 74 and 76 prior to upconversion to the phase lock loop IF of 170 MHz in the quadrature modulator combination of mixers 82 and 84. The upconverted modulation at the 170 MHz IF containing either the PCS1900 or AMPS signals is filtered 86 and applied to the divider 88 prior to being fed to the PLL phase detector. The reference input to the phase detector is derived by a divider 90 from the prime second local oscillator 58. A charge pump 94 feeds from the phase detector to the loop filter 96, whose output controls the dual-band VCO 98. The phase lock loop is closed and effectively channel tuned by filtering 26 a sample of the preamp 100 output, and downconverting to the 170 MHz IF via the mixer 68 using the same synthesised first local oscillator 34 as for receive. This IF is filtered by filter 28 and applied in the loop to the modulator at the 90 degree phase shifter 80. The transmit PLL intermediate frequency filters will not need to be of high shape factor.

Figure 3:
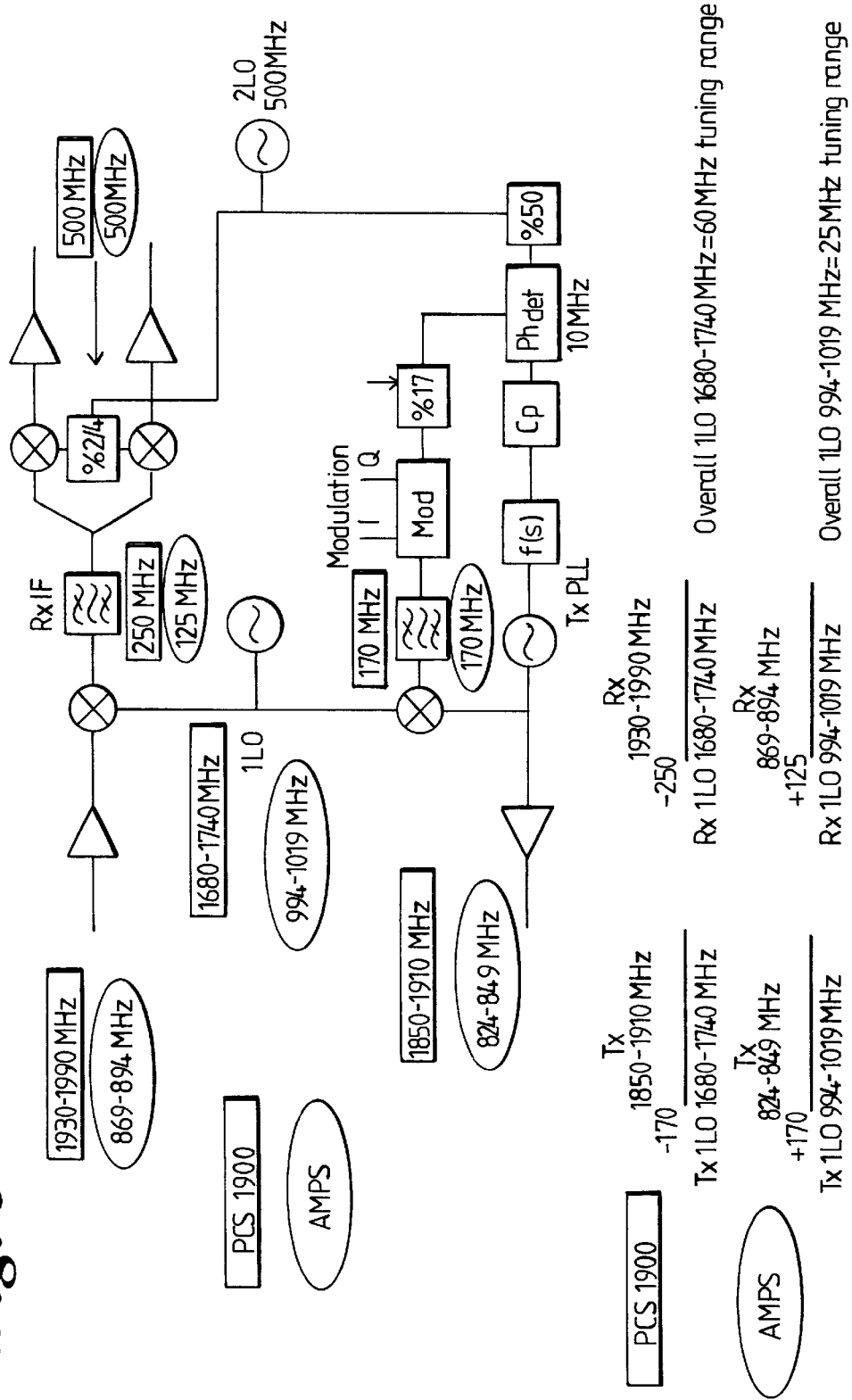
FIG. 3 is a frequency plan of a PCS1900-AMPS dual mode radio front end.

In terms of the frequency generation or local oscillator requirements for this dual mode radio, It can be seen from FIGS. 2 and 3 that all the required local oscillator frequencies are derived from two voltage controlled oscillators, referenced via two phase lock loops to 13.0 MHz.

With reference to the radio frequency plan of FIG. 3, it can be seen that the first local oscillator signals are derived from a single dual band voltage controlled oscillator (VCO). Band selection operation of the first local oscillator VCO in the frequency band 1680 to 1740 MHz for the digital PCS1900 case or in the frequency band 994 to 1019 MHz for the analogue AMPS case is used and four intermediate frequencies (IFs) result. The two receive IFs have been arranged to be integer related to the 500 MHz prime second local oscillator (2LO) and to be at frequencies convenient for SAW channel filter implementation. The two transmit IFs have been arranged to be the same frequency and reducible by integer division to a 10 MHz reference frequency.

The quadrature signal local oscillators required to mix the two receive IFs down to baseband are readily derived by division from the 500 MHz 2LO. For the PCS1900 receive state the 1930 to 1990 MHz band is downconverted to a 250 MHz IF using a channel tuning synthesised 1LO covering the range 1680 to 1740 MHz. The channel filtered 250 MHz IF is downconverted to baseband in-phase and quadrature signals using a 250 MHz quadrature local oscillator derived from the 500 MHz 2LO.

For the PCS1900 transmit state, in-phase and quadrature baseband signals are upconverted to a 170 MHz signal using the 170 MHz IF derived within the phase lock loop by downconversion with the channel tuning receive local oscillator from the RF output. The 170 MHz IF is divided and phase locked to a 10 MHz reference and this output controls the transmit RF VCO frequency via a charge pump and loop filter.

For the AMPS receive state the 869 to 894 MHz band is downconverted to a 125 MHz IF using a channel tuning synthesised 1LO covering the range 994 to 1019 MHz. The channel filtered 125 MHz IF is downconverted to baseband in-phase and quadrature signals using a 125 MHz quadrature local oscillator derived from the 500 MHz 2LO.

The AMPS transmit state is similar to the PCS1900 in that in-phase and quadrature baseband signals are upconverted to a 170 MHz signal using a 170 MHz IF derived within the phase lock loop by downconversion with the channel tuning receive local oscillator from the RF output. The 170 MHz IF is divided and phase locked to a 10 MHz reference and this output controls the transmit RF VCO frequency via a charge pump and loop filter.

A feature of the 1LO synthesised frequency generation is that the transmit and receive local oscillator tuning bands are arranged to overlap by using different transmit and receive IFs. In this way the overall tuning range of the 1LO for PCS1900 can be constrained such that transmit to receive switching can be achieved in an allowable time. It is a requirement in the AMPS case for the transmit and receive first local oscillators to tune the same range and channel as the AMPS radio simultaneously transmits and receives. In this dual-mode it has been arranged that for the PCS1900 case the transmit and receive first local oscillators exactly overlap also.

The two receive quadrature second local oscillator signals are derived from the prime 500 MHz 2LO as follows. The prime second local oscillator provides a synthesised 500 MHz signal 58 which is fed to a switchable divide by two or divide by four divider 56 resulting in a 250 MHz or 125 MHz local oscillator. For the transmit path the 500 MHz is divided by 50 in divider 78 resulting in the 10 MHz reference.

Referring now to the local oscillators, they receive a 13.0 MHz signal which is processed through dividers set by control signals: this allows the local oscillators to operate in the PCS1900 and the AMPS transmit or receive modes. Associated with the first local oscillator, there are band control means operable to adjust the local oscillator frequency in response to channel detection means which detect the channel employed in any communication. In the case of the mobile initiating a call then the channel detection means will be able to detect which channels are available and be able to effect the control switches for the PCS1900-AMPS circuits as appropriate. The programmable dividers operate under the control of data, clock and enable commands. The prime second local oscillator 2LO produces a fixed frequency signal at 500 MHz, and employs a feedback path to ensure that the frequency is maintained. By these means the required frequencies 250, 125 and 10 MHz can be derived from the 13.0 MHz reference, as can the required first local oscillator frequencies.

The synthesiser first local oscillator accomplishes dual mode operation by having a dual band local oscillator which tunes a single band for transmit and receive either 1680 to 1740 MHz for the PCS1900 or 994 to 1019 MHz for AMPS transmit and receive. In the case of PCS1900 the 1LO tunes in 200 kHz spaced channels and for AMPS in 30 kHz channels, defined by the by R/Q divider on the reference to the phase lock loop, and the programmable divider.

Figure 4:
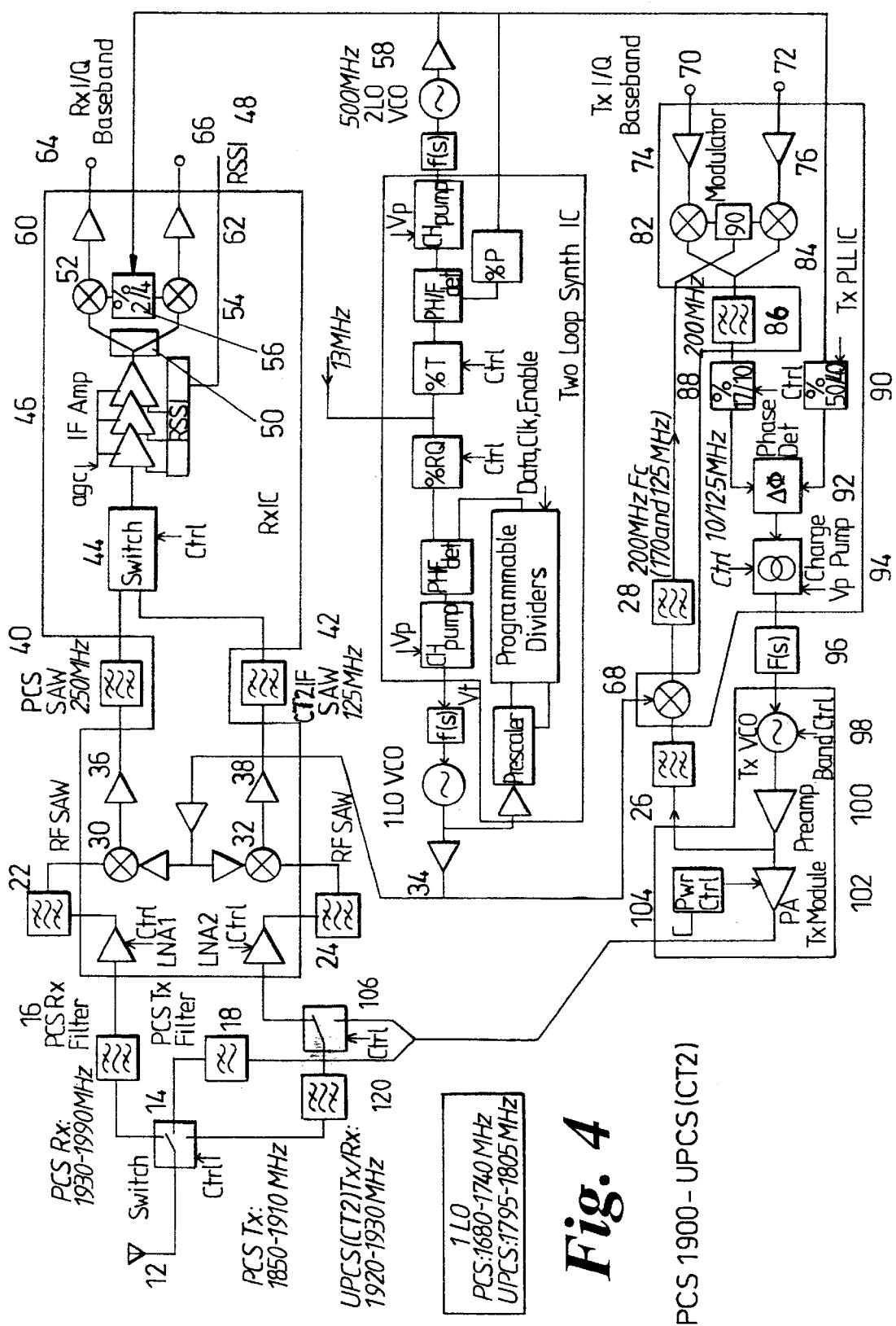
FIG. 4 is a detailed implementation of a PCS1900-UPCS (CT2) dual mode radio front end.

Referring now to FIG. 4, there is shown a second embodiment of the present invention, comprising a dual mode radio front end for the reception of both digital cellular PCS1900 signals and digital cordless UPCS(CT2) signals. UPCS (CT2) operates in the frequency band 1920 to 1930 MHz and in the same frequency channel on the receive and transmit links by way of time division duplexing.

The PCS1900 handset operates either in a transmit mode or in a receive mode and uses frequency division duplex: UPCS(CT2) also operates in transmit or receive mode but uses the same frequecy channel with time division duplex. For this reason the switch 14 from the antenna 12 has three positions. Band pass and lowpass filters 16 and 18 are provided on the input and output lines for the PCS signals whilst a second switch 106 and single RF band filter 20 are employed for UPCS(CT2) signals. Low noise amplifiers LNA1 and LNA2 are provided on the input lines respectively. Power amplification is provided by a single band power amplifier PA continuously covering the PCS1900 band so that the UPCS(CT2) band which falls between the PCS1900 transmit and receive bands is also covered.

For PCS1900 and UPCS(CT2) separate band filters 22 and 24 are provided from the outputs of the LNAs to the inputs to the mixers 30 and 32. Similarly separate IF channel filters are provided 40 and 42. Preferably these filters are radio frequency surface acoustic wave SAW devices. The advantages provided are such that the separate receive bands can be converted down to an IF and separate channel selection performed, so that over each RF band a large number of channels can be determined.

The receive path for the digital PCS1900 signals, including the receive signal output from switch 44, is as described for the first embodiment). The mode control means identifies whether the signals are PCS1900 or UPCS(CT2) modulation and determines in which mode the transceiver is operating.

If a UPCS(CT2) radio signal were present at the antenna and a decision made to receive that signal, the switch 14 would feed the signal from the antenna 12 through band filter 20, amplifier LNA2, filter 24 to mixer 32. At mixer 32 the radio frequency signal is downconverted, using a synthesised local oscillator to a further intermediate frequency (IF) of 125 MHz which is different from that of the digital PCS1900 case. This IF signal is subsequently amplified by amplifying means 38 before channel selection by the 125 MHz filter means 42. The 125 MHz IF signal is then passed through the switching circuit 44. As in the case with the digital PCS1900 signal, the UPCS IF signal is output through the common IF amplifier, which, after amplification and mixing with a quadrature 125 MHz local oscillator signal derived through switchable divider 56 from the second local oscillator (2LO) 58, in-phase and quadrature baseband signals are provided at 64 and 66 to be fed to the analogue to digital converters and digital signal processing means (not shown).

The custom receive IC uses separate PCS1900 and UPCS LNA/down converters with external SAW image filters. Separate SAW intermediate frequency filters at 250 MHz and 125 MHz are used for PCS1900 and UPCS. For both systems the IF filtering is arranged to be for a single channel.

For transmit, the PCS1900 and UPCS baseband signals are raised to separate 170 and 125 MHz intermediate frequency (IF) within a phase lock loop (PLL) which effectively converts the IF to any selected channel in either the PCS1900 or UPCS(CT2) RF bands. The baseband signals, derived from digital signal processing and digital to analogue converters (not shown), are input at ports 70 and 72, and are amplified by amplifiers 74 and 76 prior to upconversion to the phase lock loop IF 170 or 125 Mhz in the quadrature modulator combination of mixers 82 and 84. The upconverted modulation at the 170 MHz IF containing either the PCS1900 or UPCS signals is filtered 86 and applied to the divider 88 prior to being fed to the PLL phase detector. The reference input to the phase detector is derived by a divider 90 from the prime second local oscillator 58. A charge pump 94 feeds from the phase detector to the loop filter 96, whose output controls the dual-band VCO 98. The phase lock loop is closed and effectively channel tuned by filtering 26 a sample of the preamplifier 100 output, and downconverting to the 170 or 125 MHz IF via the mixer 68 using the same synthesised first local oscillator 34 as for receive. This IF is filtered 28 and applied in the loop to the modulator at the 90 degree phase shifter 80. The transmit PLL intermediate frequency filters will not need to be of high shape factor.

Figure 5:
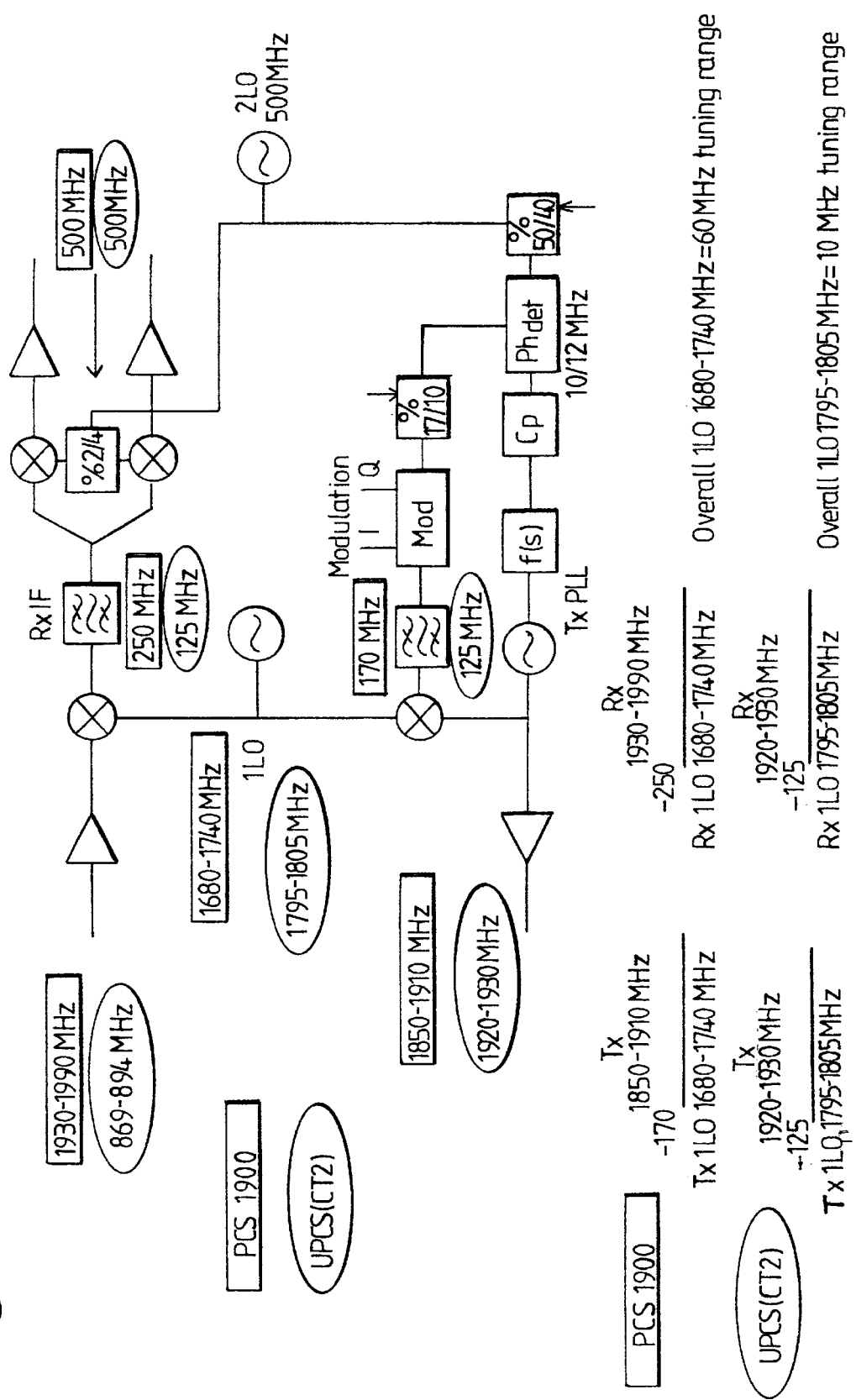
FIG. 5 is a frequency plan of a PCS1900-UPCS(CT2) dual mode radio front end.

In terms of the frequency generation or local oscillator requirements for this dual mode radio, it can be seen from FIGS. 4 and 5 that all the required local oscillator frequencies are derived from two voltage controlled oscillators, referenced via two phase lock loops to 13.0 MHz.

With reference to the radio frequency plan of FIG. 5, it can be seen that the first local oscillator signals are derived from a single dual band voltage controlled oscillator (VCO). Band selection operation of the first local oscillator VCO in the frequency band 1680 to 1740 MHz for the digital PCS1900 case or in the frequency band 1795 to 1805 MHz for the UPCS(CT2) case is used and four intermediate frequencies (IFs) result. The two receive IFs have been arranged to be integer related to the 500 MHz prime second local oscillator (2LO) and to be at frequencies convenient for SAW channel filter implementation. The two transmit IFs have been arranged to be at frequencies reducible by integer division to a 10 or 12.5 MHz reference frequency, both themselves derived by integer division from the 500 Mhz prime second local oscillator (2LO).

The quadrature signal local oscillators required to mix the two receive IFs down to baseband are readily derived by division from the 500 MHz 2LO. For the PCS1900 receive state the 1930 to 1990 MHz band is downconverted to a 250 MHz IF using a channel tuning synthesised 1LO covering the range 1680 to 1740 MHz. The channel filtered 250 MHz IF is downconverted to baseband in-phase and quadrature signals using a 250 MHz quadrature local oscillator derived from the 500 MHz 2LO.

For the PCS1900 transmit state, in-phase and quadrature baseband signals are upconverted to a 170 MHz signal using the 170 MHz IF derived within the phase lock loop by downconversion with the channel tuning receive local oscillator from the RF output. The 170 MHz IF is divided and phase locked to a 10 MHz reference and this output controls the transmit RF VCO frequency via a charge pump and loop filter.

For the UPCS receive state the 1920 to 1930 MHz band is downconverted to a 125 MHz IF using a channel tuning synthesised 1LO covering the range 1795 to 1805 MHz. The channel filtered 125 MHz IF is downconverted to baseband in-phase and quadrature signals using a 125 MHz quadrature local oscillator derived from the 500 MHz 2LO.

The UPCS(CT2) transmit state is similar to the PCS1900 in that in-phase and quadrature baseband signals are upconverted to a 125 MHz signal using a 125 MHz IF derived within the phase lock loop by downconversion with the channel tuning receive local oscillator from the RF output. The 125 MHz signal is divided and phase locked to a 12.5 MHz reference and this output controls the transmit RF VCO frequency via a charge pump and loop filter.

A feature of the 1LO synthesised frequency generation is that the transmit and receive local oscillator tuning bands are arranged to overlap by using different transmit and receive IFs. In this way the overall tuning range of the 1LO for PCS1900 can be constrained such that transmit to receive switching can be achieved in an allowable time. It is a requirement in the UPCS(CT2) case for the transmit and receive first local oscillators to tune the same range and channel, as the UPCS(CT2) radio uses the same air frequency for uplink and downlink. The 1LO is arranged to have a 1680 to 1805 MHz tuning range to cover the requirements of both PCS1900 and UPCS(CT2). In this dual-mode it has been arranged that for the PCS1900 case the transmit and receive first local oscillators exactly overlap also.

The two receive quadrature second local oscillator signals are derived from the prime 500 MHz 2LO as follows. The prime second local oscillator provides a synthesised 500 MHz signal which is fed to a switchable divide by two or divide by four divider 56 resulting in a 250 MHz or 125 MHz local oscillator. For the transmit path the 500 MHz is divided by 50 in divider 90 resulting in the 10 MHz reference, or it is divided by 40 in divider 90 to give a 12.5 MHz reference.

Referring now to the local oscillators, they receive a 13 MHz signal which is processed through dividers set by control signals: this allows the local oscillators to operate in the PCS1900 and UPCS(CT2) modes.

In the case of the mobile initiating a call then the channel detection means will be able to detect which channels are available and be able to effect the control switches for the PCS1900-UPCS(CT2) circuits as appropriate. The programmable dividers operate under the control of data, clock and enable commands. The prime second local oscillator 2LO produces a fixed frequency signal at 500 MHz, and employs a feedback path to ensure that the frequency is maintained. By these means the required frequencies 250, 125, 12.5 and 10 MHz can be derived from the 13 MHz reference, as can the required first local oscillator frequencies.

The synthesised first local oscillator accomplishes dual mode operation by having a local oscillator which tunes a single band from 1680 to 1805 MHz which covers the PCS requirement for transmit and receive of 1680 to 1740 MHz and the UPCS(CT2) requirement of 1795 to 1805 MHz. In the case of PCS1900 the 1LO tunes in 200 kHz spaced channels and for UPCS(CT2) in 100 kHz channels, defined by the by R/O divider on the reference to the phase lock loop, and the programmable divider.

Figure 6:
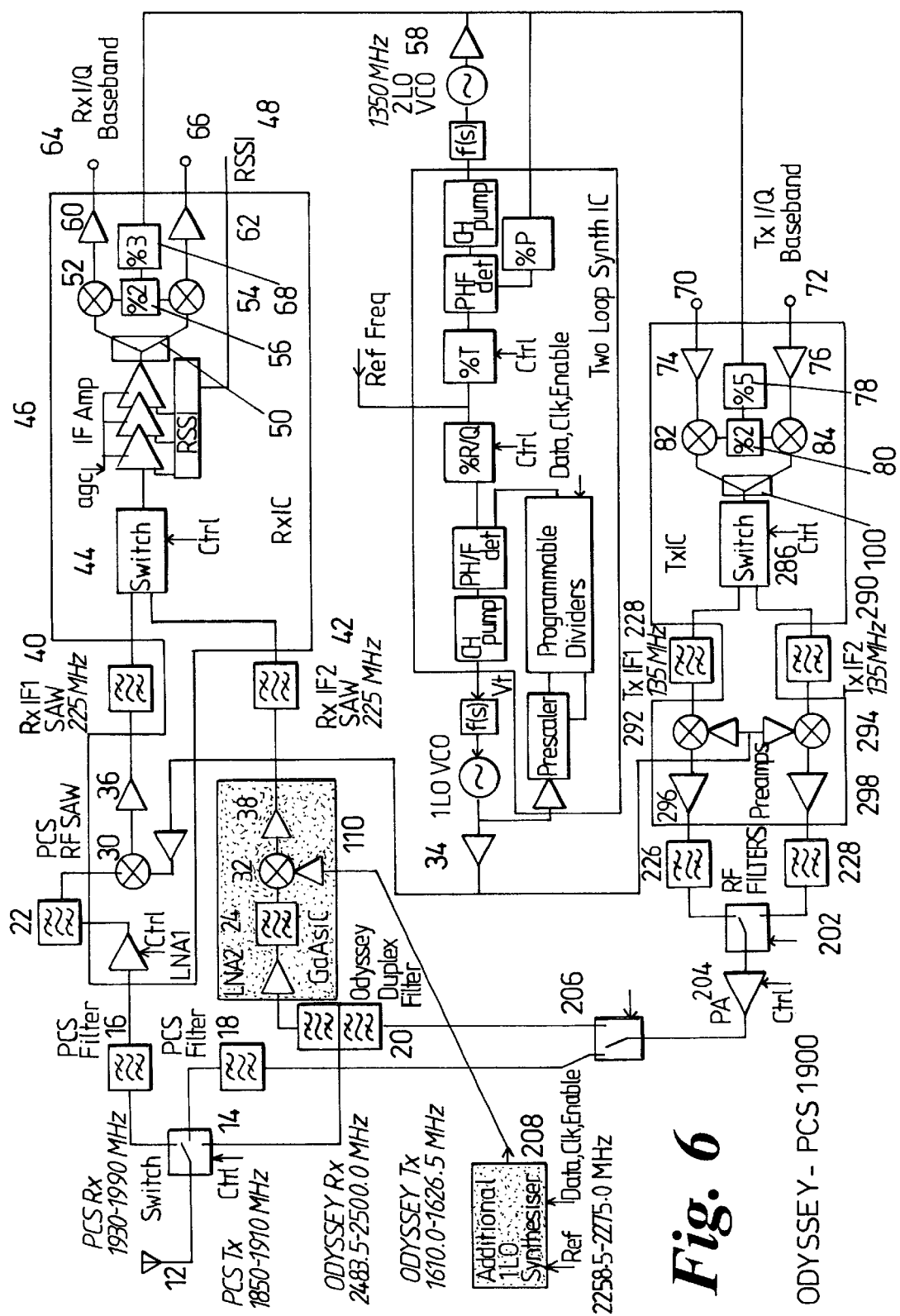
FIG. 6 is a detailed implementation of a PCS1900-Odyssey dual mode radio front end.

Referring now to FIG. 6, there is shown one embodiment of the present invention, comprising a dual mode radio front end for the reception of both digital PCS1900 signals and digital ODYSSEY signals. ODYSSEY operates in the frequency band 2483.5 to 2500.0 MHz on the receive link from the satellite to the handset and in the 1745.5 to 1761.5 MHz band on the transmit link from the handset to the satellite.

The PCS1900 handset operates either in a transmit mode or in a receive mode: ODYSSEY can operate in both modes simultaneously. For this reason the switch 14 from the antenna 12 has three positions. Band pass filters 16 and lowpass filter 18 are provided on the input and output lines for the PCS1900 signals whilst a single duplex filter 20 is employed for the input and output lines of the ODYSSEY signals. Low noise amplifiers LNA1 and LNA2 are provided at the receive inputs. A separate LNA downconverter GaAs MMIC is provided for the ODYSSEY mode to meet a noise figure requirement not achievable in silicon.

For PCS1900 and ODYSSEY separate band filters 22 and 24 are provided from the outputs of the LNAs to the inputs to the mixers 30 and 32. Similarly separate IF channel filters are provided 40 and 42. Preferably these filters are radio frequency surface acoustic wave SAW devices. The advantages provided are such that the separate receive bands can be converted down to an IF and separate channel selection performed, so that over each RF band a large number of channels can be determined.

Turning now to the receive path for the digital PCS1900 signals, including the receive signal output from switch 44, is as described with reference to the first embodiment. The mode control means identifies whether the signals are PCS1900 or ODYSSEY modulation and determines in which mode the transceiver is operating.

If an ODYSSEY radio signal were present at the antenna and a decision made to receive that signal, the switch 14 would feed the signal from the antenna 12 through duplex filter 20, amplifier LNA2, filter 24 to mixer 32. At mixer 32 the radio frequency signal is downconverted, using an output from the additional synthesised local oscillator to a further intermediate frequency (IF) of 225 MHz, which although having the same centre frequency as PCS1900 case, has a channel bandwidth commensurate with the ODYSSEY mode. This IF signal is subsequently amplified by amplifying means 38 before channel selection by the 225

MHz filter means 42. The 225 MHz IF signal is then passed through the switching circuit 44. As in the case with the digital PCS1900 signal, the ODYSSEY IF signal is output through the common IF amplifier, which, after amplification and mixing with a quadrature 225 MHz local oscillator signal derived through switchable dividers 56 and 68 from the second local oscillator (2LO), in-phase and quadrature baseband signals are provided at 64 and 66 to be fed to the analogue to digital converters and digital signal processing means (not shown).

PCS1900 uses the custom silicon LNA/down-converter on the receive IC with external SAW image filters. While ODYSSEY uses a seperate custom GaAs MMIC for the LNA/down-converter. For both systems the IF filtering is arranged to be for a single channel.

For transmit, the PCS1900 and ODYSSEY baseband signals are raised to 135 MHz intermediate frequencies (IFs) in both cases. These baseband signals, derived from digital signal processing and digital to analogue converters (not shown), are input at ports 70 and 72, and are amplified by amplifiers 74 and 76 prior to upconversion in the quadrature modulator combination of mixers 82 and 84, using one of two local oscillators, at 135 MHz for PCS1900 and ODYSSEY, derived through switchable division in 78 and 80 from the 1350 MHz synthesised second local oscillator. The upconverted IF containing either the PCS1900 or ODYSSEY signals at 135 MHz is combined 100 and applied to the switch 286 and then to the transmit IF filter combination 288 and 290 in order to select the required bandwidth of IF. Either of the two IFs are then upconverted in mixers 292 or 294 to the PCS1900 transmit band at 1850 to 1910 MHz and the ODYSSEY transmit band at 1745.5 to 1761.5 MHz. The respective signals are RF band filtered by 226 and 228 prior to power amplification and then fed to the antenna via separate filters and switch 14.

Figure 7:
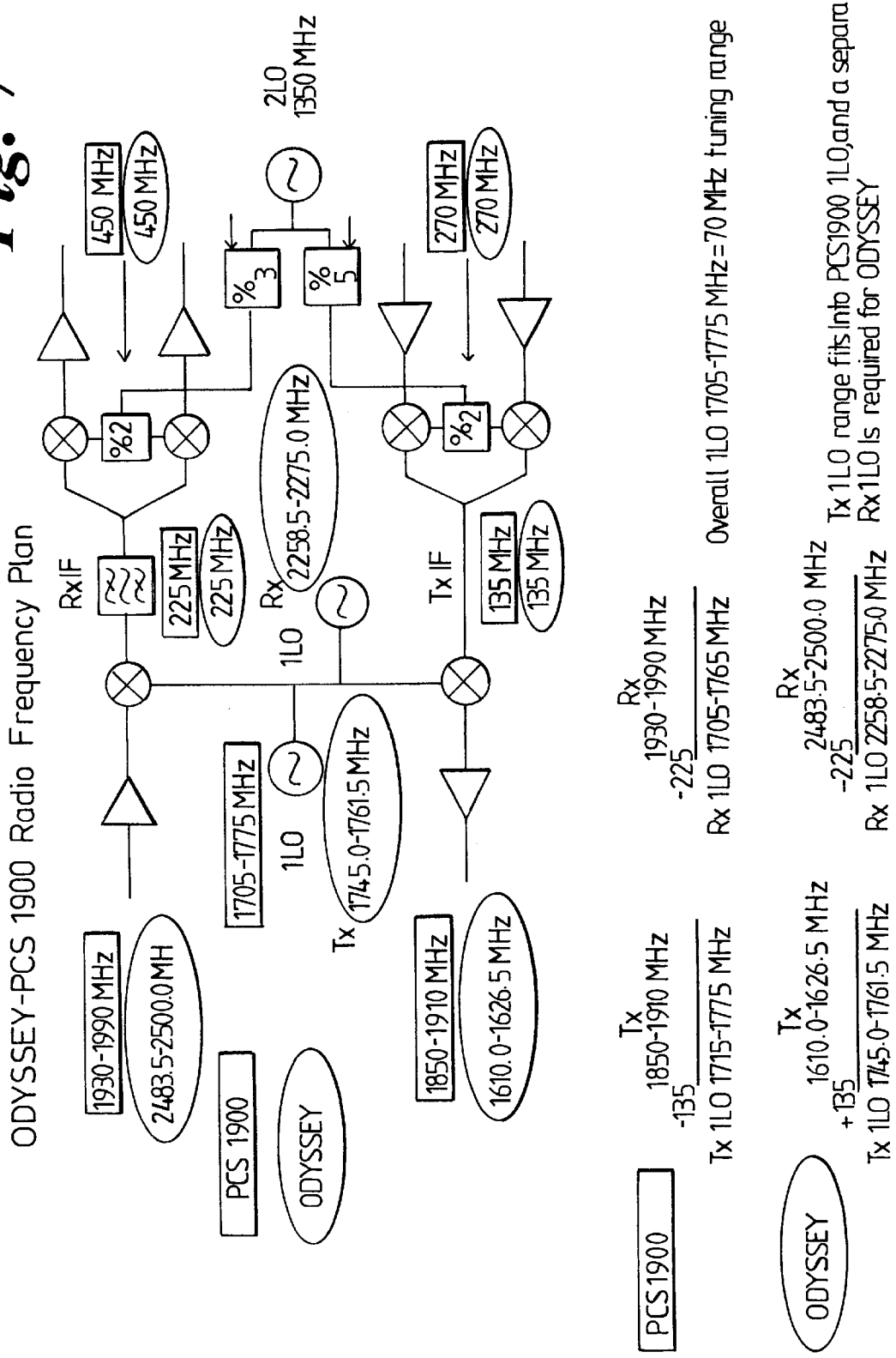
FIG. 7 is a frequency plan of a PCS1900-Odyssey dual mode radio front end.

In terms of the frequency generation or local oscillator requirements for this dual mode radio, it can be seen from FIGS. 6 and 7 that all the required local oscillator frequencies are derived from three synthesisers, referenced to 13.0 MHz.

With reference to the radio frequency plan of FIG. 7, it can be seen that the first local oscillator signals are derived from two 1LO synthesisers, themselves referenced to a 13.0 MHz crystal reference (not shown). The two receive IFs have been arranged to be the same frequency and integer related to the 1350 MHz prime second local oscillator (2LO) and to be at frequencies convenient for separate SAW channel filter implementation. The two transmit IFs have been arranged to be the same frequency and an integer function of the prime second local oscillator by division and mixing. The prime second local oscillator is also referenced to the 13.0 Mhz crystal reference.

The quadrature signal local oscillators required to mix the two receive IFs down to baseband are readily derived by integer division from the 1350 MHz 2LO. For the PCS1900 receive state the 1930 to 1990 MHz band is downconverted to a 225 MHz IF using a channel tuning synthesised 1LO covering the range 1705 to 1765 MHz. The channel filtered 225 MHz IF is downconverted to baseband in-phase and quadrature signals using a 225 MHz quadrature local oscillator derived from the 1350 MHz 2LO.

For the PCS1900 transmit state in-phase and quadrature baseband signals are upconverted to a 135 MHz IF using a 135 MHz quadrature local oscillator derived from the 1350 MHz 2LO. The filtered 135 MHz IF is upconverted to the 1850 to 1910 MHz band using a channel tuning synthesised 1LO covering the range 1715 to 1775 MHz.

For the ODYSSEY receive state the 2483.5 to 2500.0 MHz band is downconverted to a 225 MHz IF using a channel tuning additional synthesised 1LO covering the range 2258.5 to 2275.0 MHz. The channel filtered 225 MHz IF is downconverted to baseband in-phase and quadrature signals using a 225 MHz quadrature local oscillator derived from the 1350 MHz 2LO.

The ODYSSEY transmit state is similar to the PCS1900 in that in-phase and quadrature baseband signals are upconverted to a 135 MHz signal using 135 MHz quadrature local oscillator derived from the 1350 MHz 2LO. The filtered 135 MHz IF is upconverted to the 1610.0 to 1626.5 MHz band using a channel tuning synthesised 1LO covering the range 1745.0 to 1761.5 MHz. It can be seen that the ODYSSEY transmit 1LO has been arranged to be provided by the same 1LO as that of PCS1900.

A feature of the 1LO synthesised frequency generation is that the PCS1900 transmit and receive local oscillator tuning bands are arranged to overlap by using different transmit and receive IFs. In this way the overall tuning range of the 1LO for PCS1900 can be constrained such that transmit to receive switching of the 1LO can be achieved in an allowable time. In the ODYSSEY case the transmit and receive first local oscillators are separate due to the 873.5 MHz duplex spacing.

The two receive quadrature second local oscillator signals are derived from the prime 1350 MHz 2LO as follows. The prime second local oscillator provides a synthesised 1350 MHz signal which is fed to a divide by three divider 68 resulting in a 450 MHz feed to the divide by two divider 56, which feeds quadrature 225 MHz oscillator signal to the mixers 52 and 54.

Similarly for the transmit chain the two transmit quadrature second local oscillator signals are derived from the prime 1350 MHz 2LO by a divide by five divider 78 resulting in a 270 MHz feed to the divide by two divider 80, which feeds quadrature 135 MHz oscillator signal to the mixers 82 and 84.

Referring now to the local oscillators, they receive a 13.0 MHz signal which is processed through dividers set by control signals: this allows the local oscillators to operate in the PCS1900 or ODYSSEY transmit or receive modes In the case of the mobile initiating a call then the channel detection means will be able to detect which channels are available and be able to effect the control switches for the PCS1900-ODYSSEY circuits as appropriate. The programmable dividers operate under the control of data, clock and enable commands. The prime second local oscillator 2LO produces a fixed frequency signal at 1350 MHz, and employs a feedback path to ensure that the frequency is maintained. By these means the required frequencies 225 and 135 MHz can be derived from the 13.0 MHz reference, as can the required first local oscillator frequencies.

The synthesised first local oscillator accomplishes operation for PCS1900 transmit and receive together with ODYSSEY transmit by having a local oscillator which tunes a single band 1705 to 1775 MHz. In the case of PCS1900 the 1LO tunes in 200 kHz spaced channels, defined by the by R/Q divider on the reference to the phase lock loop, and the programmable divider. For the ODYSSEY receive mode a separate 1LO synthesiser is used tuning 2258.5 to 2275.0 MHz.

Figure 8:
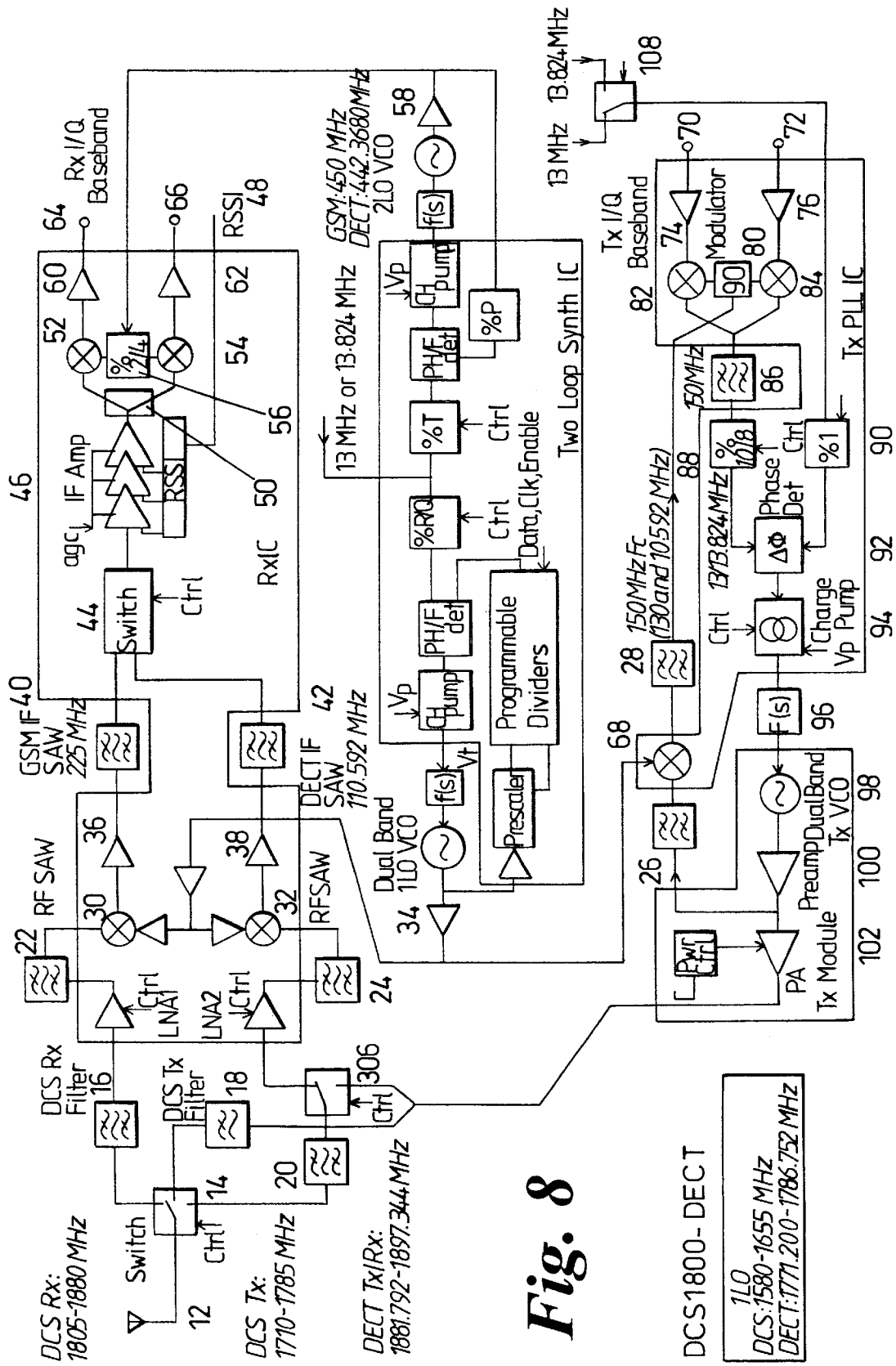
FIG. 8 is a detailed implementation of a DCS1800-DECT dual mode radio front end.

Referring now to FIG. 8, there is shown one embodiment of the present invention, comprising a dual mode radio front end for the reception of both digital cellular DCS1800 signals and digital cordless DECT signals. DCS1800 operates in the frequency band 1805 to 1880 MHz on the receive downlink to the handset and in the 1710 to 1785 MHz band on the transmit uplink from the handset. DECT operates in the frequency 1881.792 to 1897.344 Mhz and in the same frequency channel on the handset transmit and receive links by way of time division duplexing.

The DCS1800 handset operates either in a transmit mode or in a receive mode and uses frequency division duplex: DECT also operates in transmit or receive mode but uses the same frequency channel with time division duplex. For this reason the switch 14 from the antenna 12 has three positions. Band pass filters 16 and low pass filter 18 are provided on the input and output lines for the DCS1800 signals whilst a second switch 306 and single RF band filter 20 are employed for DECT signals. Low noise amplifiers LNA1 and LNA2 are provided on the input respectively. Power amplification is provided by a dual band PA.

For DCS1800 and DECT separate band filters 22 and 24 are provided from the outputs of the LNAs to the inputs to the mixers 30 and 32. Following the buffer amplifiers 36 and 38 separate IF channel filters are provided 40 and 42. Preferably these filters are radio frequency surface acoustic wave SAW devices. The advantages provided are such that the separate receive bands can be converted down to an IF and separate channel selection performed, so that over each RF band a large number of channels can be determined.

Turning now to the receive path for the digital DCS1800 signals, when the switch 14 directs incoming digital DCS1800 signals to the DCS1800 receive path, the signals from the band select filter 22 are passed to a mixer 30 which mixes the received signal with a signal from a synthesised local oscillator 34 to produce an intermediate frequency (IF) signal at 225 MHz which is subsequently amplified by further amplifying means 36. The DCS1800 signals are then filtered by the 225 MHz GSM IF channel filter (the DCS1800 modulation protocol is the same as that of GSM so the filter is a GSM channel filter), and the filtered IF signal is then passed through a second switching circuit 44 which operates simultaneously with the first switch 14 by a mode control means (not shown). The mode control means identifies whether the signals are DCS1800 or DECT modulation and determines in which mode the transceiver is operating.

The receive signal output from switch 44 is fed to an IF amplifier with automatic gain control and a receive signal strength indicator (RSSI) 48. After amplification, the signal path is routed through splitter 50 and the signals are output to a mixer pair 52 and 54, and after mixing with a quadrature 225 MHz signal derived through switchable division in 56 from a synthesised 450 MHz second local oscillator (2LO), in-phase and quadrature baseband signals are amplified by amplifiers 60 and 62, to provide output signals at 64 and 66 to be fed to the analogue to digital converters and digital signal processing means (not shown).

If a DECT radio signal were present at the antenna and a decision made to receive that signal, the switch 14 would feed the signal from the antenna 12 through filter 20, amplifier LNA2, filter 24 to mixer 32. At mixer 32 the radio frequency signal is downconverted, using a synthesised local oscillator to the intermediate frequency (IF) of 110.592 MHz which is different from that of the DCS1800 case. This IF signal is subsequently amplified by amplifying means 38 before channel selection by the 110.592 MHz filter means 42. As in the case with the DCS1800 signal, the DECT IF signal is output through the common IF amplifier , which, after amplification and mixing with a quadrature local oscillator signal of 110.592 MHz derived through divider 56 from the dual frequency second local oscillator (2LO), in-phase and quadrature baseband signals are provided at 64 and 66 to be fed to the analogue to digital converters and digital signal processing means (not shown).

The custom receive IC uses separate DCS1800 and DECT LNA/down converters with external SAW image filters. Separate SAW intermediate frequency filter at 225 and 110.592 Mhz are used for DCS1800 and DECT. For both systems the IF filtering is arranged to be for a single channel.

For transmit, the DCS1800 and DECT baseband signals are raised to intermediate frequencies (IFs) at 130 and 110.592 MHz within a phase lock loop (PLL) which effectively converts the IF to any selected channel in either the DCS1800 or DECT RF bands. The baseband signals, derived from digital signal processing and digital to analogue converters (not shown), are input at ports 70 and 72, and are amplified by amplifiers 74 and 76 prior to upconversion to the phase lock loop IF of 130 or 110.592 MHz in the quadrature modulator combination of mixers 82 and 84. The upconverted modulation at the IF containing either the DCS1800 or DECT signals is filtered 86 and applied to the divider 88 prior to being fed to the PLL phase detector. The reference input to the phase detector is derived by a divider 90 from the switched 108 dual reference oscillators (not shown). A charge pump 94 feeds from the phase detector to the loop filter 96, whose output controls the dual-band VCO 98. The phase lock loop is closed and effectively channel tuned by filtering 26 a sample of the preamp 100 output, and downconverting to the 130 or 110.592 MHz IF via the mixer 68 using the same synthesised first local oscillator 34 as for receive. This IF is filtered 28 and applied in the loop to the modulator at the 90 degree phase shifter 80. The transmit PLL intermediate frequency filters will not need to be of high shape factor and can be arranged to bracket both IFs.

Figure 9:
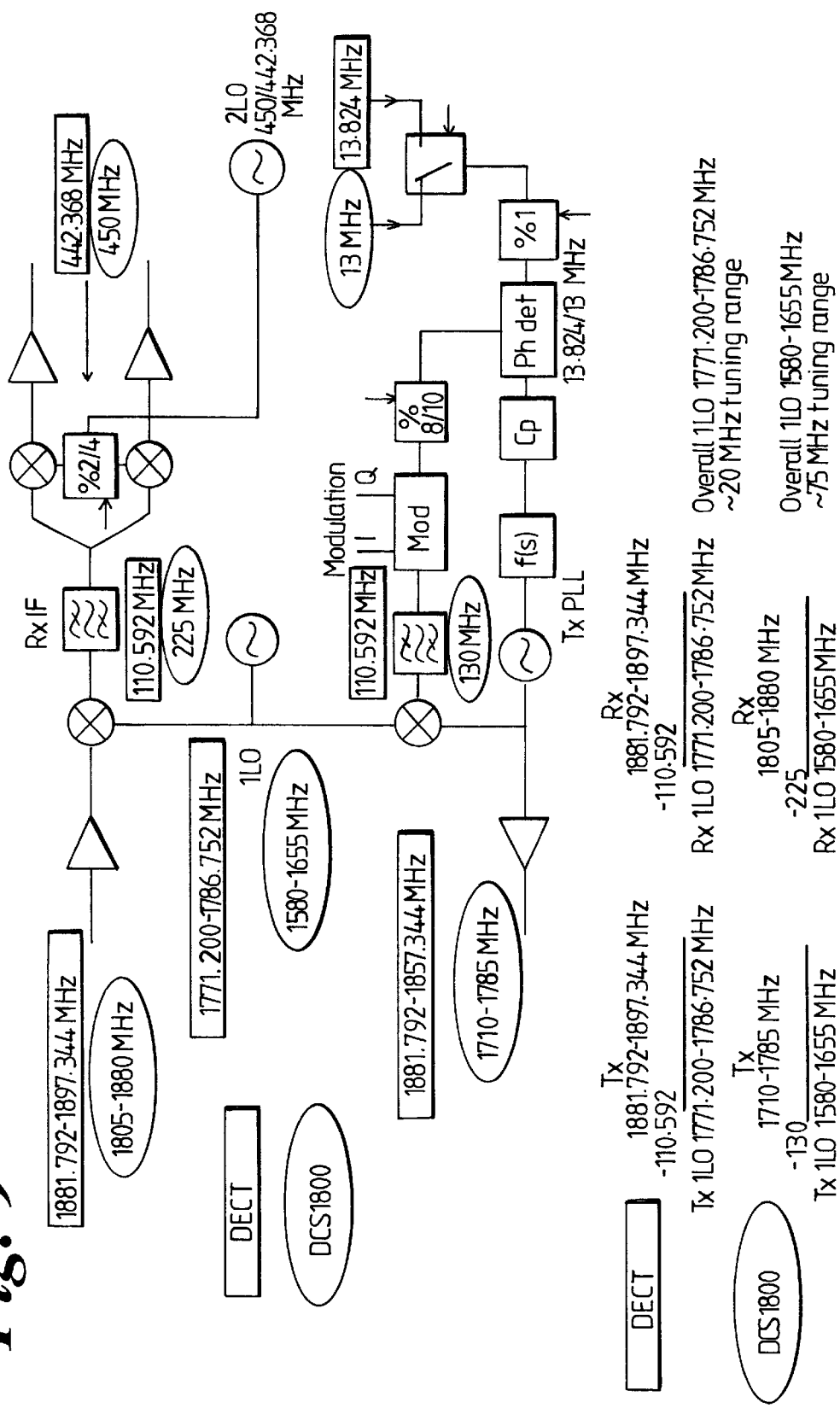
FIG. 9 is a frequency plan of a DCS1800-DECT dual mode radio front end.

In terms of the frequency generation or local oscillator requirements for this dual mode radio, it can be senn from FIGS. 8 and 9 that all the required local oscillator frequencies are derived from two voltage controlled oscillators, referenced via two phase lock loops to 13.0 or 13.824 MHz.

With reference to the radio frequency plan of FIG. 9, it can be seen that the first local oscillator signals are derived from a single dual band voltage controlled oscillator (VCO). Band selection operation of the dual band first local oscillator VCO in the frequency band 1580 to 1655 MHz for the DCS1800 case or in the frequency band 1771.200 to 1786.752 MHz for the DECT case is used and four intermediate frequencies (IFs) result. The two receive IFs have been arranged to be integer related to the 450/442.368 MHz dual prime second local oscillator (2LO) and to be at frequencies convenient for SAW channel filter implementation. The two transmit IFs have been arranged to be at frequencies reducible by integer division to a 13 or 13.824 MHz reference frequency.

The quadrature signal local oscillators required to mix the two receive IFs down to baseband are readily derived by division from the 450/442.368 MHz 2LO. The dual frequency prime 2LO is switched to the required frequency for DCS1800 or DECT and respectively referenced to 13.0 or 13.824 MHz. For the DCS1800 receive state the 1805 to 1880 MHz band is downconverted to a 225 MHz IF using a channel tuning synthesised 1LO covering the range 1580 to 1655 MHz. The channel filtered 225 MHz IF is downconverted to baseband in-phase and quadrature signals using a 225 MHz quadrature local oscillator derived from the dual frequency 2LO when programmed for the 450 MHz DCS1800 mode.

For the DCS1800 transmit state, in-phase and quadrature baseband signals are upconverted to a 130 MHz signal using the 130 MHz IF derived within the phase lock loop by downconversion with the channel tuning receive local oscillator from the RF output. The 130 MHz IF is divided and phase locked to a 13 MHz reference and this output controls the transmit RF VCO frequency via a charge pump and loop filter.

For the DECT receive state the 1881.792 to 1897.344 MHz band is downconverted to a 110.592 MHz IF using a channel tuning synthesised 1LO covering the range 1771.200 to 1786.752 MHz. The channel filtered 110.592 MHz IF is downconverted to baseband in-phase and quadrature signals using a 110.592 MHz quadrature local oscillator oscillator derived from the dual frequency 2LO when programmed for the 442.368 MHz DECT mode.

The DECT transmit state is similar to the DCS1800 in that in-phase and quadrature baseband signals are upconverted to a 110.592 MHz signal using a 110.592 MHz IF derived within the phase lock loop by downconversion with the channel tuning receive local oscillator from the RF output. The 110.592 MHz IF is divided and phase locked to a 13.824 MHz reference and this output controls the transmit RF VCO frequency via a charge pump and loop filter.

A feature of the 1LO synthesised frequency generation is that in the DCS1800 mode the transmit and receive local oscillator tuning bands are arranged to exactly overlap by using different transmit and receive IFs. In this way the tuning range of the 1LO can be constrained such that retuning the 1LO between transmit and receive is unnecessary. It is a requirement in the DECT mode for the transmit and receive first local oscillators to tune the same frequency range and channel, as the DECT radio uses the same air frequency for uplink and downlink. The 1LO is arranged to have two frequency bands at 1771.200 to 1786.752 MHz to cover the requirements of DECT and 1580 to 1655 MHz to cover DCS1800.

The two receive quadrature second local oscillator signals are derived from the prime 2LO as follows. The prime second local oscillator provides a synthesised 450 or 442.368 MHz signal 58 which is fed to a switchable divide by two or four divider 56 resulting in a 225 or 110.592 MHz local oscillator. For the DCS1800 transmit path the 13 MHz reference is divided by 1 in divider 90 resulting in the 13 MHz reference. For the DECT transmit path the 13.824 MHz is divided by 1 in divider 90 resulting in the 13.824 MHz reference (the divider will already be a part of the integrated circuit and can be set to divide by 1).

Referring now to the local oscillators, they receive a 13.0 or 13.824 MHz signal which is processed through dividers set by control signals: this allows the local oscillators to operate in the DCS1800 or the DECT modes. Associated with the dual band first local oscillator, there are band control means operable to adjust the local oscillator frequency in response to channel detection means which detect the channel employed in any communication. In the case of the mobile initiating a call then the channel detection means will be able to detect which channels are available and be able to effect the control switches for the DCS1800-DECT circuits as appropriate. The programmable dividers operate under the control of data, clock and enable commands. The prime second local oscillator 2LO produces a two frequencies at 450 and 442.368 MHz, and employs a feedback path to ensure that the frequency is maintained. By these means the required frequencies 225, 130, and 110.592 MHz can be derived from the 13.0 and 13.824 MHz references, as can the required first local oscillator frequencies.

The synthesised first local oscillator accomplishes dual mode operation by having a dual band local oscillator which tunes dual bands; 1580 to 1655 MHz for DCS1800 or 1771.200 to 1786.752 MHz for DECT. In the DCS1800 mode the 1LO tunes in 200 kHz spaced channels and in the DECT mode 1.728 MHz spaced channels, defined by the by R/Q divider on the reference to the phase lock loop, and the programmable divider.

Figure 10:
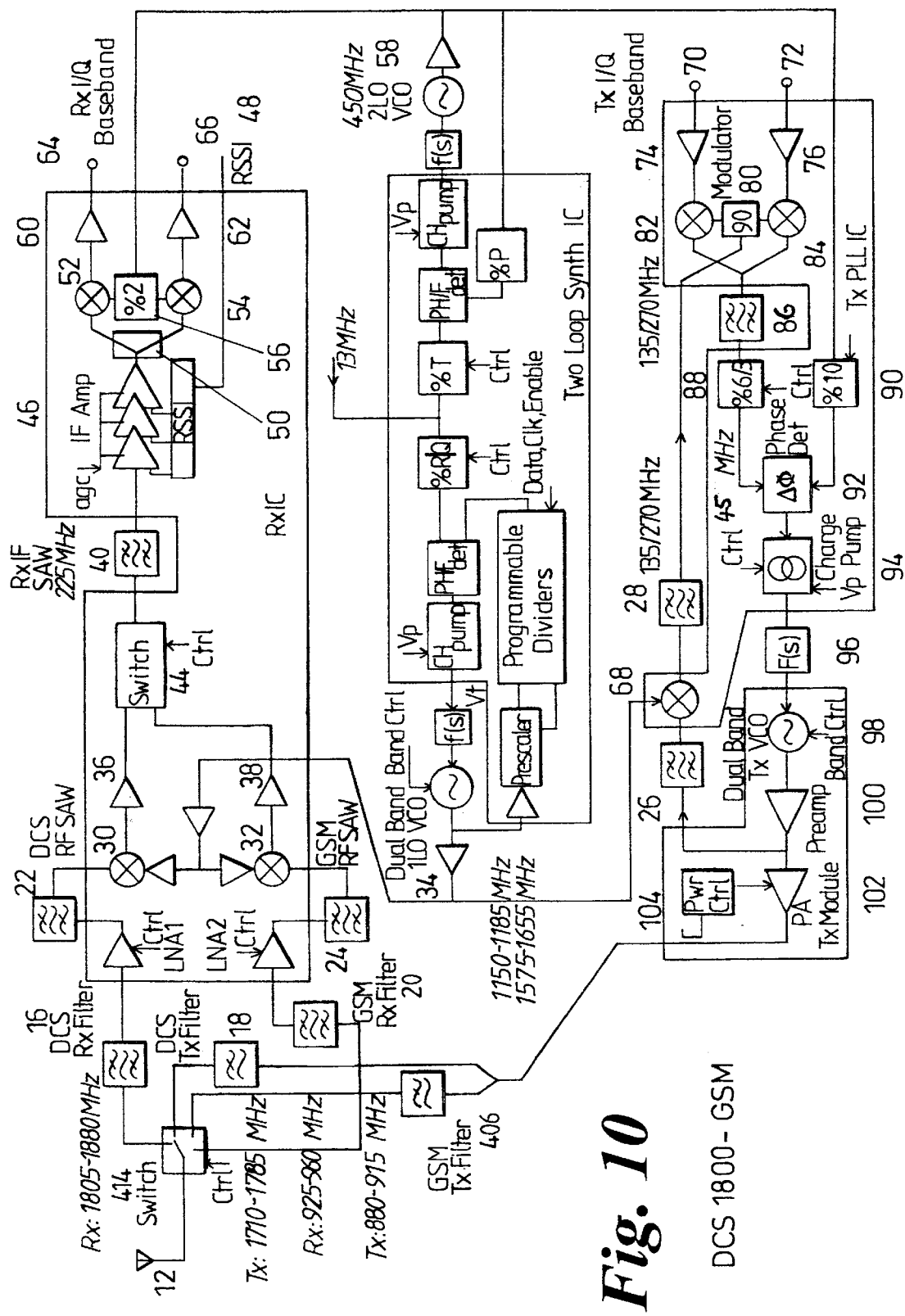
FIG. 10 is a detailed implementation of a DCS1800-GSM dual mode radio front end.

Referring now to FIG. 10, there is shown one embodiment of the present invention, comprising a dual mode radio front end for the reception of both digital DCS1800 signals and GSM signals. GSM operates in the frequency band 925 to 960 MHz on the receive link from the basestation to the handset and in the 880 to 915 MHz band on the transmit link from the handset to the basestation.

The DCS1800 and GSM handsets both operate in either a transmit mode or in a receive mode. For this reason the switch 14 from the antenna 12 has four positions. Band pass filters 16,18 are provided on the input and output lines for the DCS1800 signals along with similar filters 20 and 406 for GSM. Low noise amplifiers LNA are provided on the input and output lines respectively. Power amplification is provided by a dual band power amplifier PA.

For DCS1800 and GSM separate band filters 22 and 24 are provided from the outputs of the LNAs to the inputs to the mixers 30 and 32. After buffer amplifiers 36 and 38 the different system signals are applied to a switch which selects either signal to apply to the common channel IF filter 40. Preferably this filter is a radio frequency surface acoustic wave SAW device. The advantages provided are such that the separate receive bands can be converted down to an IF and separate channel selection performed, so that over the each RF band a large number of channels can be determined.

Turning now to the receive path for the digital DCS1800 signals, when the switch 414 directs incoming digital DCS1800 signals to the DCS1800 receive path through the band filter 16 and to the LNA1 and band filter 22, the signals from the band select filter 22 are passed to a mixer 30 which mixes the received signal with a signal from a synthesised local oscillator 34 to produce an intermediate frequency (IF) signal at 225 MHz which is subsequently amplified by further amplifying means 36. The DCS1800 signals are then selected by switch 44 which operates simultaneously with the first switch 14 by a mode control means (not shown). The mode control means identifies whether the signals are DCS1800 or GSM modulation and determines in which mode the transceiver is operating. The signal is then filtered by the 225 MHz IF channel filter.

The receive signal output from IF filter 40 is fed to an IF amplifier with automatic gain control and a receive signal strength indicator (RSSI) 48. After amplification, the signal path is routed through splitter 50 and the signals are output to a mixer pair 52 and 54, and after mixing with a quadrature 225 MHz signal derived through division in 56 from a synthesised 450 MHz second local oscillator (2LO), in-phase and quadrature baseband signals are amplified by amplifiers 60 and 62, to provide output signals at 64 and 66 to be fed to the analogue to digital converters and digital signal processing means (not shown).

If GSM radio signal were present at the antenna and a decision made to receive that signal, the switch 14 would feed the signal from the antenna 12 through filter 20, amplifier LNA2, filter 24 to mixer 32. At mixer 32 the radio frequency signal is downconverted, using a synthesised local oscillator to the same intermediate frequency (IF) of 225 MHz as that of the DCS1800 case. This IF signal is subsequently amplified by amplifying means 38 before being selected by switch 44 and applied to the channel selection filter 40. As in the case with the DCS1800 signal, the GSM IF signal is output through the common IF amplifier, which, after amplification and mixing with a quadrature 225 MHz local oscillator signal derived through divider 56 from the second local oscillator (2LO), in-phase and quadrature baseband signals are provided at 64 and 66 to be fed to the analogue to digital converters and digital signal processing means (not shown).

The custom receive IC uses separate DCS1800 and GSM LNA/down converters with external SAW image filters. A common SAW intermediate frequency filter at 225 MHz is used for DCS1800 and GSM. The IF filtering is arranged to be for a single channel.

For transmit, the DCS1800 and GSM baseband signals are raised to intermediate frequencies (IFs) at 135 and 270 MHz within a phase lock loop (PLL) which effectively converts the IF to any selected channel in either the DCS1800 or GSM RF bands. The baseband signals, derived from digital signal processing and digital to analogue converters (not shown), are input at ports 70 and 72, and are amplified by amplifiers 74 and 76 prior to upconversion to the phase lock loop IF of 135 or 270 MHz in the quadrature modulator combination of mixers 82 and 84. The upconverted modulation at the IF containing either the DCS1800 or GSM signals is filtered 86 and applied to the divider 88 prior to being fed to the PLL phase detector. The reference input to the phase detector is derived by a divider 90 from the prime second local oscillator 58. A charge pump 94 feeds from the phase detector to the loop filter 96, whose output controls the dual-band VCO 98. The phase lock loop is closed and effectively channel tuned by filtering 26 a sample of the preamp 100 output, and downconverting to the 135 or 270 MHz IF via the mixer 68 using the same synthesised first local oscillator 34 as for receive. This IF is filtered 28 and applied in the loop to the modulator at the 90 degree phase shifter 80. The transmit PLL intermediate frequency filters will not need to be of high shape factor and can be arranged to bracket both IFs. In terms of the frequency generation or local oscillator requirements for this dual mode radio, it can be seen from FIGS. 10 and 11 that all the required local oscillator frequencies are derived from two voltage controlled oscillators, referenced via two phase lock loops to 13.0 MHz.

Figure 11:
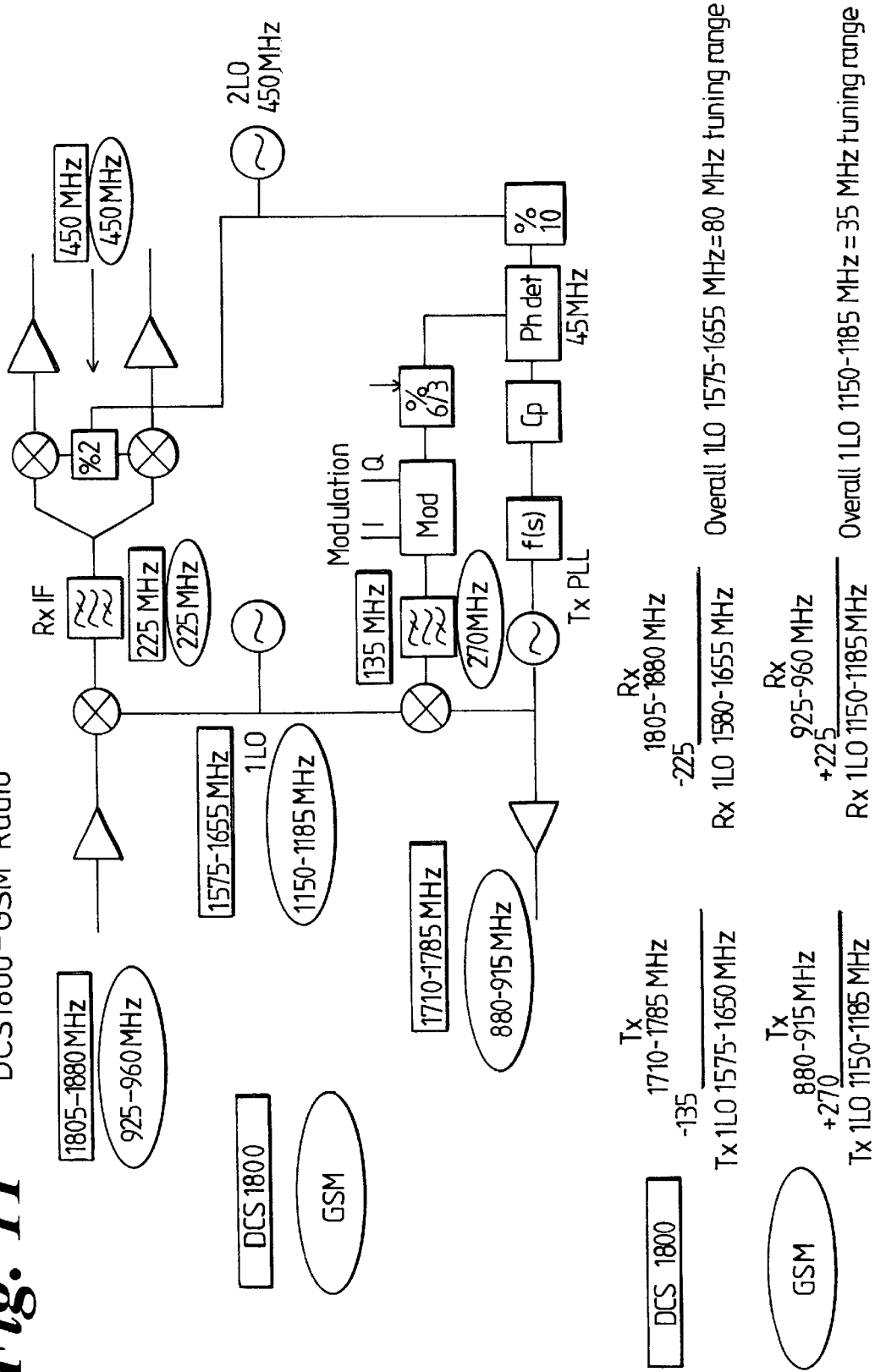
FIG. 11 is a frequency plan of a DCS1800-GSM dual mode radio front end.

With reference to the radio frequency plan of FIG. 11, it can be seen that the first local oscillator signals are derived from a single dual band voltage controlled oscillator (VCO). Band selection operation of the dual band first local oscillator VCO in the frequency band 1575 to 1650 MHz for the DCS1800 case or in the frequency band 1150 to 1185 MHz for the GSM case is used and three intermediate frequencies (IFs) result. The two receive IFs have been arranged to be integer related to the 450 MHz prime second local oscillator (2LO) and to be at frequencies convenient for SAW channel filter implementation. The two transmit IFs have been arranged to be at frequencies reducible by integer division to a 45 MHz reference frequency.

The quadrature signal local oscillators required to mix the two receive IFs down to baseband are readily derived by division from the 450 MHz 2LO. For the DCS1800 receive state the 1805 to 1880 MHz band is downconverted to a 225 MHz IF using a channel tuning synthesised 1LO covering the range 1575 to 1655 MHz. The channel filtered 225 MHz IF is downconverted to baseband in-phase and quadrature signals using a 225 MHz quadrature local oscillator derived from the 450 MHz 2LO.

For the DCS1800 transmit state, in-phase and quadrature baseband signals are upconverted to a 135 MHz signal using the 135 MHz IF derived within the phase lock loop by downconversion with the channel tuning receive local oscillator from the RF output. The 135 MHz IF is divided and phase locked to a 45 MHz reference and this output controls the transmit RF VCO frequency via a charge pump and loop filter.

For the GSM receive state the 925 to 960 MHz band is downconverted to a 225 MHz IF using a channel tuning synthesised 1LO covering the range 1150 to 1185 MHz. The channel filtered 225 MHz IF is downconverted to baseband in-phase and quadrature signals using a 225 MHz quadrature local oscillator derived from the 450 MHz 2LO.

The GSM transmit state is similar to the DCS1800 in that in-phase and quadrature baseband signals are upconverted to a 270 MHz signal using a 270 MHz IF derived within the phase lock loop by downconversion with the channel tuning receive local oscillator from the RF output. The 270 MHz IF is divided and phase locked to a 45 MHz reference and this output controls the transmit RF VCO frequency via a charge pump and loop filter.

A feature of the 1LO synthesised frequency generation is that the transmit and receive local oscillator tuning bands are arranged to overlap by using different transmit and receive IFs. In this way the overall tuning range of the 1LO for DCS1800 can be constrained such that transmit to receive switching can be achieved in an allowable time. In the GSM case it has been arranged that the transmit and receive first local oscillators exactly overlap.

The two receive quadrature second local oscillator signals are derived from the prime 450 MHz 2LO as follows. The prime second local oscillator provides a synthesised 450 MHz signal which is fed to a switchable divide by two divider 56 resulting in a 225 MHz local oscillator. For the transmit path the 450 MHz is divided by 10 in divider 90 resulting in the 45 MHz reference.

Referring now to the local oscillators, they receive a 13 MHz signal which is processed through dividers set by control signals: this allows the local oscillators to operate in the DCS1800 Transmit and receive mode, or the GSM mode. Associated with the dual band first local oscillator, there are band control means operable to adjust the local oscillator frequency in response to channel detection means which detect the channel employed in any communication. In the case of the mobile initiating a call then the channel detection means will be able to detect which channels are available and be able to effect the control switches for the DCS1800-GSM circuits as appropriate. The programmable dividers operate under the control of data, clock and enable commands. The prime second local oscillator 2LO produces a fixed frequency signal at 450 MHz, and employs a feedback path to ensure that the frequency is maintained. By these means the required frequencies 225, 270, 135 and 45 MHz can be derived from the 13 MHz reference, as can the required first local oscillator frequencies.

The synthesiser first local oscillator accomplishes dual mode operation by having a dual band local oscillator which tunes a single band for transmit and receive either 1575 to 1655 MHz for the DCS1800 or 1150 to 1185 MHz for GSM transmit and receive. In both case of DCS1800 and GSM the 1LO tunes in 200 kHz spaced channels, defined by the by R/Q divider on the reference to the phase lock loop, and the programmable divider.

Figure 12:
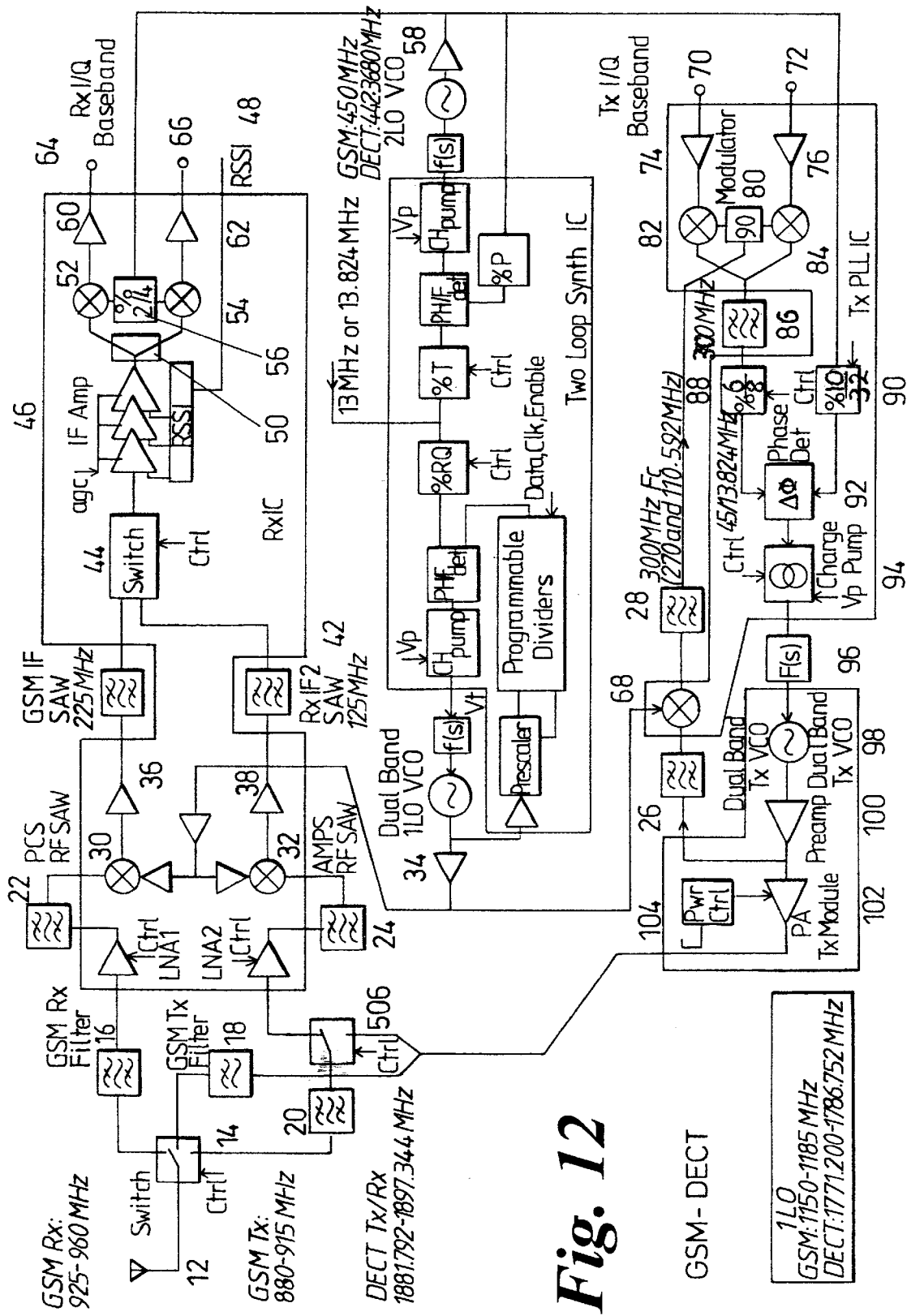
FIG. 12 is a detailed implementation of a GSM-DECT dual mode radio front end.

Referring now to FIG. 12, there is shown one embodiment of the present invention, comprising a dual mode radio front end for the reception of both digital cellular GSM signals and digital cordless DECT signals. DECT operates in the frequency 1881.792 to 1897.344 MHz and in the same frequency channel on the handset transmit and receive links by way of time division duplexing.

The GSM handset operates either in a transmit mode or in a receive mode and uses frequency division duplex: DECT also operates in transmit or receive mode but uses the same frequency channel with time division duplex. For this reason the switch 14 from the antenna 12 has three positions. Band pass filters 16 and low pass filter 18 are provided on the input and output lines for the GSM signals whilst a second switch 506 and single RF band filter 20 are employed for DECT signals. Low noise amplifiers LNA1 and LNA2 are provided on the input respectively. Power amplification is provided by a dual band PA.

For GSM and DECT separate band filters 22 and 24 are provided from the outputs of the LNAs to the inputs to the mixers 30 and 32. Following the buffer amplifiers 36 and 38 separate IF channel filters are provided 40 and 42. Preferably these filters are radio frequency surface acoustic wave SAW devices. The advantages provided are such that the separate receive bands can be converted down to an IF and separate channel selection performed, so that over each RF band a large number of channels can be determined.

Turning now to the receive path for the digital GSM signals, when the switch 14 directs incoming digital GSM signals to the GSM receive path, the signals from the band select filter 22 are passed to a mixer 30 which mixes the received signal with a signal from a synthesised local oscillator 34 to produce an intermediate frequency (IF) signal at 225 MHz which is subsequently amplified by further amplifying means 36. The GSM signals are then filtered by the 225 MHz IF channel filter, and the filtered IF signal is then passed through a second switching circuit 44 which operates simultaneously with the first switch 14 by a mode control means (not shown). The mode control means identifies whether the signals are GSM or DECT modulation and determines in which mode the transceiver is operating.

The receive signal output from switch 44 is fed to an IF amplifier with automatic gain control and a receive signal strength indicator (RSSI) 48. After amplification, the signal path is routed through splitter 50 and the signals are output to a mixer pair 52 and 54, and after mixing with a quadrature 225 MHz signal derived through switchable division in 56 from a synthesised 450 MHz second local oscillator (2LO), in-phase and quadrature baseband signals are amplified by amplifiers 60 and 62, to provide output signals at 64 and 66 to be fed to the analogue to digital converters and digital signal processing means (not shown).

If a DECT radio signal were present at the antenna and a decision made to receive that signal, the switch 14 would feed the signal from the antenna 12 through filter 20, amplifier LNA2, filter 24 to mixer 32. At mixer 32 the radio frequency signal is downconverted, using a synthesised local oscillator to the intermediate frequency (IF) of 110.592 MHz which is different from that of the GSM case. This IF signal is subsequently amplified by amplifying means 38 before channel selection by the 110.592 MHz filter means 42. As in the case with the GSM signal, the DECT IF signal is output through the common IF amplifier , which, after amplification and mixing with a quadrature local oscillator signal 110.592 MHz derived through divider 56 from the dual frequency second local oscillator (2LO), in-phase and quadrature baseband signals are provided at 64 and 66 to be fed to the analogue to digital converters and digital signal processing means (not shown).

The custom receive IC uses separate GSM and DECT LNA/down converters with external SAW image filters. Separate SAW intermediate frequency filter at 225 and 110.592 MHz are used for GSM and DECT. For both systems the IF filtering is arranged to be for a single channel.

For transmit mode, the GSM and DECT baseband signals are raised to intermediate frequencies (IFs) at 270 and 110.592 MHz within a phase lock loop (PLL) which effectively converts the IF to any selected channel in either the GSM or DECT RF bands. The baseband signals, derived from digital signal processing and digital to analogue converters (not shown), are input at ports 70 and 72, and are amplified by amplifiers 74 and 76 prior to upconversion to the phase lock loop IF of 270 or 110.592 MHz in the quadrature modulator combination of mixers 82 and 84. The upconverted modulation at the IF containing either the GSM or DECT signals is filtered 86 and applied to the divider 88 prior to being fed to the PLL phase detector. The reference input to the phase detector is derived by a divider 90 from the dual frequency prime second local oscillator 58. A charge pump 94 feeds from the phase detector to the loop filter 96, whose output controls the dual-band VCO 98. The phase lock loop is closed and effectively channel tuned by filtering 26 a sample of the preamp 100 output, and down-converting to the 270 or 110.592 MHz IF via the mixer 68 using the same synthesised first local oscillator 34 as for receive. This IF is filtered 28 and applied in the loop to the modulator at the 90 degree phase shifter 80. The transmit PLL intermediate frequency filters will not need to be of high shape factor and can be arranged to bracket both IFs.

In terms of the frequency generation or local oscillator requirements for this dual mode radio, it can be seen from FIGS. 12 and 13 that all the required local oscillator frequencies are derived from two voltage controlled oscillators, referenced via two phase lock loops to 13.0 or 13.824 MHz.

With reference to the radio frequency plan of FIG. 13, it can be seen that the first local oscillator signals are derived from a single dual band voltage controlled oscillator (VCO). Band selection operation of the dual band first local oscillator VCO in the frequency band 1150 to 1185 MHz for the GSM case or in the frequency band 1771.200 to 1786.752 MHz for the DECT case is used and four intermediate frequencies (IFs) result. The two receive IFs have been arranged to be integer related to the 450/442.368 MHz dual prime second local oscillator (2LO) and to be at frequencies convenient for SAW channel filter implementation. The two transmit IFs have been arranged to be at frequencies reducible by integer division to a 45 or 13.824 MHz reference frequency.

The quadrature signal local oscillators required to mix the two receive IFs down to baseband are readily derived by division from the 450/442.368 MHz 2LO. The dual frequency prime 2LO is switched to the required frequency for GSM or DECT and respectively referenced to 13.0 or 13.824 MHz. For the GSM receive state the 925 to 960 MHz band is downconverted to a 225 MHz IF using a channel tuning synthesised 1LO covering the range 1150 to 1185 MHz. The channel filtered 225 MHz IF is downconverted to baseband in-phase and quadrature signals using a 225 MHz quadrature local oscillator derived from the dual frequency 2LO when programmed for the 450 MHz GSM mode.

For the GSM transmit state, in-phase and quadrature baseband signals are upconverted to a 270 MHz signal using the 270 MHz IF derived within the phase lock loop by downconversion with the channel tuning receive local oscillator from the RF output. The 270 MHz IF is divided and phase locked to a 45 Mhz reference and this output controls the transmit RF VCO frequency via a charge pump and loop filter.

For the DECT receive state the 1881.792 to 1897.344 MHz band is downconverted to a 110.592 MHz IF using a channel tuning synthesised 1LO covering the range 1771.200 to 1786.752 MHz. The channel filtered 110.592 MHz IF is downconverted to baseband in-phase and quadrature signals using a 110.592 MHz quadrature local oscillator oscillator derived from the dual frequency 2LO when programmed for the 442.368 MHz DECT mode.

The DECT transmit state is similar to the GSM in that in-phase and quadrature baseband signals are upconverted to a 110.592 MHz signal using a 110.592 MHz IF derived within the phase lock loop by downconversion with the channel tuning receive local oscillator from the RF output. The 110.592 MHz IF is divided and phase locked to a 13.824 MHz reference and this output controls the transmit RF VCO frequency via a charge pump and loop filter.

A feature of the 1LO synthesised frequency generation is that in the GSM mode the transmit and receive local oscillator tuning bands are arranged to exactly overlap by using different transmit and receive IFs. In this way the tuning range of the 1LO can be constrained such that retuning the 1LO between transmit and receive is unnecessary. It is a requirement in the DECT mode for the transmit and receive first local oscillators to tune the same frequency range and channel, as the DECT radio uses the same air frequency for uplink and downlink. The 1LO is arranged to have two frequency bands at 1771.200 to 1786.752 MHz to cover the requirements of DECT and 1150 to 1185 MHz to cover GSM.

The two receive quadrature second local oscillator signals are derived from the prime 2LO as follows. The prime second local oscillator provides a synthesised 450 or 442.368 MHz signal which is fed to a switchable divide by two divider 56 resulting in a 225 or 110.592 MHz local oscillator. For the GSM transmit path the 450 MHz is divided by 10 in divider 90 resulting in the 45 MHz reference. For the DECT transmit path the 442.368 MHz is divided by 32 in divider 90 resulting in the 13.824 MHz reference.

Referring now to the local oscillators, they receive a 13.0 or 13.824 MHz signal which is processed through dividers set by control signals: this allows the local oscillators to operate in the GSM or the DECT modes. Associated with the dual band first local oscillator, there are band control means operable to adjust the local oscillator frequency in response to channel detection means which detect the channel employed in any communication. In the case of the mobile initiating a call then the channel detection means will be able to detect which channels are available and be able to effect the control switches for the GSM-DECT circuits as appropriate. The programmable dividers operate under the control of data, clock and enable commands. The prime second local oscillator 2LO produces a two frequencies at 450 and 442.368 MHz, and employs a feedback path to ensure that the frequency is maintained. By these means the required frequencies 225, 270, and 110.592 MHz can be derived from the 13.0 and 13.824 MHz references, as can the required first local oscillator frequencies.

The synthesised first local oscillator accomplishes dual mode operation by having a dual band local oscillator which tunes dual bands; 1150 to 1185 MHz for GSM or 1771.200 to 1786.752 MHz for DECT. In the GSM mode the 1LO tunes in 200 KHz spaced channels and in the DECT mode 1.728 MHz spaced channels, defined by the by R/Q divider on the reference to the phase lock loop, and the programmable divider.

In order to implement a dual mode radio architecture, problems arise in the case of separate frequencies in various circuits. There is a danger that coupling effects giving rise to intermodulation products arise which will distort signals. Thus the case of a single silicon semiconductor substrate is not appropriate because this is a likely case in which intermodulation products will develop. A three chip 'horizontal' partitioning is convenient, with a chip to carry the receive front end circuits; a chip to carry the transmit front end circuits and a chip to carry the two local oscillators. Such a partitioning is necessary whereby the transmit intermediate frequencies do not interfere with the receive path. It is possible to utilise a single chip which is readily available for dual frequency synthesis, and this will reduce spurious clock interference into transmit and receive paths. This minimum complexity three chip solution radio architecture keeps the frequency generation simple and easily realisable. Simple low shape factor filtering should suffice for the transmit PLL intermediate frequencies.

Standard ceramic filters can be used to separate the transmit and receive RF bands of the different operating protocols, with the AMPS and ODYSSEY filters being of the duplexer type. An antenna switch is included to select one of the non-duplexed transmit or receive signals, or the duplexed transmit and receive.

Whilst the invention has been described in relation to particular sets of dual frequency/protocols, by suitable choice of intermediate frequencies, the method described can be extended to other dual frequency/protocol scenarios.

The disclosures in British patent application No 9603316.2, from which this application claims priority, and in the abstract accompanying this application are incorporated herein by reference.

What is claimed is:

1. A radio front end transceiver operable to receive and transmit radio signals in different frequency bands and modulation formats, the transceiver comprising:
   (i) a first receive path arranged to receive signals of a first modulation format at a first radio frequency band;
   (ii) a second receive path arranged to receive signals of a second different modulation format at a second different radio frequency band;
   (iii) a first transmit path arranged to transmit signals of the first modulation format and first radio frequency band;
   (iv) a second transmit path arranged to transmit signals of the second modulation format and second radio frequency band;
   (v) circuitry for conversion between the respective radio frequency band and an intermediate frequency provided in each of the paths;
   (vi) intermediate frequency circuitry for conversion between the respective intermediate frequency and baseband provided in each of the paths, wherein at least some of the intermediate frequency circuitry is common to both receive paths and at least some of the intermediate frequency circuitry is common to both transmit paths; and wherein the intermediate frequencies are different for the different modulation formats; said intermediate frequency circuitry comprising separate channel filters for the different modulation formats and wherein the transceiver further comprises:
   (vii) a dual loop frequency synthesiser arranged to derive local oscillator frequency bands suitable for use by the intermediate frequency circuitry on each of the paths; and wherein the transmit and receive local oscillator frequency bands are arranged to overlap, by switching intermediate frequencies, whereby the tuning range is limited.

2. A radio front end transceiver according to claim 1, wherein the single dual loop frequency synthesiser is further arranged to derive local oscillator requirements for use by the circuitry for converting the signals between the radio frequency bands and the intermediate frequency bands.

3. A radio front end transceiver according to claim 1 wherein a single first local oscillator is operable for the radio frequency to intermediate frequency conversion, the first local oscillator arranged to receive control signals relating to the input frequency band and modulation format and signals from a feedback loop incorporating a programmable divider.

4. A radio front end transceiver according to claim 3 wherein said dual loop frequency synthesiser comprises a first local loop which is arranged to derive the local oscillator frequency bands for the transmit and receive paths such that those bands overlap.

5. A radio front end transceiver according to a claim 1 wherein the transceiver comprises a single second local oscillator 2LO, wherein in the receive path, the required baseband frequency signals are obtained by mixing the intermediate frequency signals with signals derived from integer division of the second local oscillator output.

6. A radio front end transceiver according to claim 1 wherein two first local oscillators are operable for the radio frequency to intermediate frequency conversion, each first local oscillator receiving an input from the dual loop frequency synthesiser.

7. A radio front end transceiver according to any one of claims 1, 2, 5 and 6, wherein the transceiver is provided with a means to ascertain the frequency band and modulation format.

8. A mobile radio handset incorporating a radio front end transceiver in accordance with claim 1.

9. A method of operating a radio front end transceiver as claimed in claim 1 said method comprising the steps of:

(i) receiving radio signals;

(ii) converting the radio signals to signals at an intermediate frequency band;

(iii) converting the intermediate frequency band signals to baseband signals.

10. A method of operating a radio front end transceiver as claimed in claim 1 comprising the steps of:

(i) obtaining baseband signals;

(ii) converting the baseband signals to an intermediate frequency band; and (iii) converting the intermediate frequency band signals to radio signals and transmitting the radio signals.

11. A dual mode radio transceiver comprising several circuits and operable according to two frequency band and modulation formats, wherein, in a common first circuit, disparate radio air interface signals are downconverted, with a first local oscillator, and filtered with switched separate intermediate frequency filters, amplified and converted using a second local oscillator, to in-phase and quadrature baseband signals, wherein, in a second circuit, disparate baseband modulation format in-phase and quadrature signals are upconverted to their respective disparate radio air interface signals in a common circuit configured as a phase lock loop upconverting modulator, which uses the first local oscillator common to the first circuit and a frequency reference derived from the second local oscillator, wherein, the frequency synthesis is arranged so that only two phase locked voltage controlled oscillators are required, and such that in the receive path intermediate frequency signals are mixed with signals derived from integer division of the second local oscillator output, the second local oscillator being itself phase locked to the frequency reference, and the first local oscillator frequencies all derived from the same frequency reference, with the higher frequency radio system local oscillator bands arranged to overlap, by switching intermediate frequencies, whereby the tuning range is limited.

* * * * *